(12) United States Patent
Schad et al.

(10) Patent No.: US 8,469,693 B2
(45) Date of Patent: Jun. 25, 2013

(54) LOW PROFILE STACK MOLD CARRIER

(75) Inventors: Robert D. Schad, Toronto (CA);
Carsten Link, Burlington (CA);
Hemant Kumar, Brampton (CA)

(73) Assignee: Athena Automation Ltd., Vaughan (CA)

( * ) Notice: Subject to any disclaimer, the term of this patent is extended or adjusted under 35 U.S.C. 154(b) by 26 days.

(21) Appl. No.: 13/212,808

(22) Filed: Aug. 18, 2011

(65) Prior Publication Data

US 2012/0052144 A1 Mar. 1, 2012

Related U.S. Application Data

(60) Provisional application No. 61/376,459, filed on Aug. 24, 2010, provisional application No. 61/490,130, filed on May 26, 2011.

(51) Int. Cl.
*B29C 45/66* (2006.01)

(52) U.S. Cl.
USPC .......................... 425/451.5; 425/190; 425/592

(58) Field of Classification Search
USPC .............. 425/190, 192 R, 451, 451.4, 451.5, 425/451.6, 592, 593
See application file for complete search history.

(56) References Cited

U.S. PATENT DOCUMENTS

| | | | | |
|---|---|---|---|---|
| 2,233,354 A | * | 2/1941 | Thilenius ....................... | 425/162 |
| 3,103,701 A | * | 9/1963 | Calchera et al. ............... | 425/406 |
| 3,179,981 A | * | 4/1965 | Gravesen ...................... | 425/593 |
| 3,224,037 A | * | 12/1965 | Robbins et al. ............... | 425/547 |
| 3,292,214 A | * | 12/1966 | Battenfeld et al. ............ | 425/592 |
| 3,574,896 A | * | 4/1971 | Fernholz ....................... | 425/160 |
| 3,577,596 A | * | 5/1971 | Bullard et al. ................ | 425/151 |
| 3,597,798 A | * | 8/1971 | McDonald ..................... | 425/590 |
| 3,609,816 A | * | 10/1971 | McDonald ..................... | 425/593 |
| 3,674,400 A | | 7/1972 | Sauerbruch et al. | |
| 3,736,092 A | * | 5/1973 | Konig et al. ................ | 425/451.6 |
| 3,841,823 A | | 10/1974 | Hehl | |
| 3,854,856 A | * | 12/1974 | Herbst et al. .................. | 425/173 |
| 3,963,401 A | * | 6/1976 | Latter ........................... | 425/574 |
| 3,976,416 A | * | 8/1976 | Hehl ............................. | 425/593 |
| 4,273,524 A | * | 6/1981 | Smith ........................ | 425/450.1 |
| 4,315,728 A | | 2/1982 | Hehl | |
| 4,341,511 A | * | 7/1982 | Laurent et al. ................ | 425/150 |
| 4,408,981 A | | 10/1983 | Brown | |

(Continued)

FOREIGN PATENT DOCUMENTS

DE 1931432 1/1971
EP 1214182 6/2002

*Primary Examiner* — Yogendra Gupta
*Assistant Examiner* — Emmanuel S Luk
(74) *Attorney, Agent, or Firm* — Bereskin & Parr LLP/S.E.N.C.R.L.,s.r.l.

(57) ABSTRACT

An injection molding machine can include a base, a stationary platen fixed to the base for holding a first mold section and a moving platen for holding a second mold section. The moving platen can be slidably supported on a platen slide surface fixed to the base. The injection molding machine can also include a stack mold carriage for holding a mold center section. An actuator can be coupled to the stack mold carriage for translating the stack mold carriage along the machine axis towards and away from the stationary platen, the actuator comprising a driven member coupled to a carriage connection portion. The carriage connection portion can transfer motion from the driven member to translation of the stack mold carriage. The carriage connection portion can be joined to the stack mold carriage at an elevation below the platen slide surface.

20 Claims, 22 Drawing Sheets

U.S. PATENT DOCUMENTS

| | | |
|---|---|---|
| 4,453,912 A | 6/1984 | Hehl |
| 4,473,346 A | 9/1984 | Hehl |
| 4,573,901 A | 3/1986 | Hehl |
| 4,588,364 A * | 5/1986 | Schad .......................... 425/135 |
| 4,773,845 A * | 9/1988 | Nagura et al. ................ 425/592 |
| 4,929,166 A | 5/1990 | DiSimone et al. |
| 5,069,613 A * | 12/1991 | Inaba et al. .................... 425/150 |
| 5,104,308 A | 4/1992 | Morton et al. |
| 5,122,051 A * | 6/1992 | Joyner .......................... 425/556 |
| 5,149,471 A * | 9/1992 | Catanzaro et al. ........... 264/40.5 |
| 5,297,952 A * | 3/1994 | Leonhartsberger ........... 425/593 |
| 5,511,963 A * | 4/1996 | Hehl ............................. 425/190 |
| 5,603,969 A * | 2/1997 | Guindani et al. ............. 425/593 |
| 5,772,420 A | 6/1998 | Holmes |
| 5,843,496 A * | 12/1998 | Ito et al. ....................... 425/589 |
| 5,971,743 A * | 10/1999 | Virginio ....................... 425/593 |
| 6,027,681 A * | 2/2000 | Teng et al. ................... 264/297.2 |
| 6,050,804 A * | 4/2000 | Tamaki et al. ................ 425/190 |
| 6,053,724 A * | 4/2000 | Eppich .......................... 425/593 |
| 6,155,811 A | 12/2000 | Looije et al. |
| 6,165,405 A * | 12/2000 | Harmsen et al. ......... 264/272.17 |
| 6,503,075 B1 | 1/2003 | Schad et al. |
| 6,739,857 B2 | 5/2004 | Lichtinger |
| 6,824,381 B2 | 11/2004 | Wohlrab |
| 6,830,448 B2 | 12/2004 | Lichtinger |
| 7,134,869 B2 | 11/2006 | Lichtinger |
| 7,182,590 B2 * | 2/2007 | Nishimura et al. ........ 425/451.6 |
| 7,186,113 B2 | 3/2007 | Lichtinger |
| 7,314,362 B2 | 1/2008 | Lichtinger |
| 7,364,422 B2 * | 4/2008 | Canossi ........................ 425/541 |
| 7,665,984 B2 | 2/2010 | Teng |
| 2001/0051193 A1 * | 12/2001 | Lichtinger .................... 425/576 |
| 2002/0018826 A1 * | 2/2002 | Abe et al. ................... 425/451.6 |
| 2002/0022069 A1 * | 2/2002 | Kasal et al. ................... 425/593 |
| 2003/0008035 A1 * | 1/2003 | Urbanek ....................... 425/593 |
| 2003/0039719 A1 * | 2/2003 | Armbruster ................... 425/593 |
| 2003/0108636 A1 * | 6/2003 | Harada et al. .............. 425/451.6 |
| 2004/0067276 A1 * | 4/2004 | Watanabe ..................... 425/595 |
| 2004/0180109 A1 * | 9/2004 | Nishimura et al. ........... 425/592 |
| 2005/0003040 A1 * | 1/2005 | Lichtinger .................... 425/576 |
| 2008/0044514 A1 | 2/2008 | Schultz et al. |
| 2008/0075801 A1 | 3/2008 | Sorensen |
| 2009/0155406 A1 | 6/2009 | Teng |
| 2010/0171237 A1 | 7/2010 | Armbruster |
| 2010/0278957 A1 * | 11/2010 | Keeley et al. .............. 425/451.6 |

* cited by examiner

LOW PROFILE STACK MOLD CARRIER

This application claims the benefit of Provisional Application Ser. No. 61/376,459, filed Aug. 24, 2010, and claims the benefit of Provisional Application Ser. No. 61/490,130, filed May 26, 2011, each of which is hereby incorporated herein by reference.

FIELD

The disclosure relates to injection molding machines having a stack mold feature, and to apparatuses and methods for movably supporting a stack mold in an injection molding machine.

INTRODUCTION

The following is not an admission that anything discussed below is prior art or part of the common general knowledge of persons skilled in the art.

U.S. Pat. No. 5,104,308 (Morton et al.) discloses a mechanism for controlling the movements of the plates in a multiple plate mold. The mold is secured to a press in an injection molding system having a support plate and top clamp plate. The mechanism includes a member pivotally mounted to the outside of the mold and an arm attaching the press support plate to the member. In a preferred embodiment, two guides are attached to the press top clamp plate and middle moving plate of a three plate mold. The guides travel in curved channels formed in the member to determine the relative positions of the plates.

U.S. Pat. No. 6,155,811 (Looije et al.) discloses a carrier assembly for supporting the mold center section of a stack mold. The carrier assembly has a pair of mold supports to which the mold center section can be attached. Each mold support is movable along a linear rail attached to the base of a molding machine and has at least one block containing a linear bearing mounted thereto for engaging the linear rail. Each mold support further includes a linkage assembly for connecting the mold support to other platens so as to synchronize movement of each mold support with movement of at least one other platen.

U.S. Pat. No. 7,665,984 (Teng) discloses a platen-linkage assembly, including: (i) a pair of supports being movably guidable along a respective one of a pair of linear-guide rails, (ii) mold-carrier sections being configured to support a mold stack; and (iii) a pair of primary links being rotatably coupled with and being positioned between a chosen one of: (i) the mold-carrier sections, and (ii) the pair of supports.

SUMMARY

The following summary is provided to introduce the reader to the more detailed discussion to follow. The summary is not intended to limit or define the claims.

According to one aspect of the invention, an injection molding machine can include a base, a stationary platen fixed to the base for holding a first mold section and a moving platen for holding a second mold section. The moving platen can be slidably supported on a platen slide surface fixed to the base and can be moveable towards and away from the stationary platen along a machine axis. The injection molding machine can also include a stack mold carriage for holding a mold center section. The stack mold carriage can be slidably coupled to the base and positioned intermediate the fixed and moving platens. An actuator can be coupled to the stack mold carriage for translating the stack mold carriage along the machine axis towards and away from the stationary platen, the actuator comprising a driven member coupled to a carriage connection portion. The carriage connection portion can transfer motion from the driven member to translation of the stack mold carriage. The carriage connection portion can be joined to the stack mold carriage at an elevation below the platen slide surface.

The stack mold carriage can include a mounting face for connection to the mold center section. The mounting face can be positioned at an elevation below the platen slide surface.

The injection molding machine can also include two upper tie bars and two lower tie bars, each tie bar extending parallel to the machine axis, between the stationary and moving platens for axially clamping together the first and second mold sections during an injection cycle. The carriage connection portion can be disposed at an elevation below the lower tie bars.

The stack mold carriage, when installed for use, can have an axial extent that is less than a lateral spacing between the two lower tie bars and a lateral extent that is greater than the lateral spacing between the two lower tie bars. The stack mold carrier can be removable from the machine by rotating and then lifting the stack mold carrier through the lateral spacing between the at least two lower tie bars.

The stationary platen can includes a sprue hole generally centrally located of the stationary platen, and the machine axis passes through the center of the sprue hole. The mounting face can extend laterally across the machine axis from a front edge disposed toward an operator side of the injection molding machine to a back edge disposed toward a non-operator side of the injection molding machine.

The mounting face can be positioned at an elevation below the lower tie bars when the moving platen is in and moves between the advanced and retracted positions relative to the stationary platen.

The stack mold carriage, when installed for use, can include a first carriage side edge disposed towards a first side of the machine, and an opposed second carriage side edge laterally spaced apart from the first side edge in a lateral direction that is generally perpendicular to the machine axis. The carriage connection portion can extend generally parallel to the machine axis and can be disposed laterally between the first and second carriage side edges. The driven member can be laterally offset from the machine axis.

The injection molding machine can also include a pair of stack mold carriage rails to which the stack mold carriage is slidably coupled. The stack mold carriage rails can be separate from the platen slide surface.

The platen slide surface can be defined by a pair of platen rails on opposed sides of the base, and the stack mold carriage rails can be positioned laterally inboard of the platen rails.

The driven member can include at least a first link having a first link first end pivotally coupled to the moving platen by a first pivot joint and a first link second end spaced apart from the first link first end. The carriage connection portion can also include at least a second link having a second link first end pivotally coupled to the first link second end by a second pivot joint and being pivotally coupled to the stack mold carriage by a third pivot joint. Translation of the moving platen can cause rotation of the first link and the second link and translation of the stack mold carriage.

The third pivot joint can define a generally vertical third pivot axis fixed in position relative to the stack mold carriage and about which the second link pivots.

The injection molding machine can also include a third link coupled between the second link and the stationary platen. The third link can have a third link first end and a third link second end. The second link can also include a second link second end spaced part from the second link first end and the third pivot axis can be disposed horizontally intermediate the second link first end and the second link second end. The second link second end can be pivotally coupled to the third link first end by a fourth pivot joint.

The first link can pivot about a generally vertical first pivot axis defined by the first pivot joint. The first pivot axis can be generally parallel to and laterally spaced apart from the third pivot axis.

The injection molding machine can also include a pair of stack mold carriage rails along which the stack mold carriage is slidably coupled. The stack mold carriage rails can be laterally spaced apart from each other by a lateral rail spacing. The second link can have a second link length generally extending between the second link first end and the second link second end. The second link length can be less than the lateral rail spacing.

The second link can also include a second link axis extending between the second link first end and the second link second end. When the second link is pivoted so that the second link axis is generally orthogonal to the machine axis, the first link can be generally aligned with and vertically registered beneath a first one of the two lower tie bars and the third link can be generally aligned with and vertically registered beneath a second one of the two lower tie bars.

The stack mold carriage can include, when installed for use, a central portion comprising a first axial edge facing the moving platen and an opposed second axial edge facing the stationary platen and spaced apart from the first axial edge by a central axial distance. The second link can include a second link width generally orthogonal to the second link axis that is less than the central axial distance.

When the second link is pivoted so that the second link axis is generally orthogonal to the machine axis, the second link can be disposed generally entirely beneath the stack mold carriage. When viewed from above, first and second open regions can be provided adjacent each axial edge of the stack mold carriage. Each open region can be bounded laterally by the first and second lower tie bars and can be bounded axially at least in part by the respective first and second axial edges of the stack mold carriage.

According to another broad aspect of the invention, an injection molding machine can include a base, a stationary platen fixed to the base for holding a first mold section and a moving platen for holding a second mold section. The moving platen can be slidably supported on a platen slide surface fixed to the base, and can be moveable towards and away from the stationary platen along a machine axis. The injection molding machine can also include a first carriage rail that extends parallel to the machine axis along a first side of the base, and an opposed second carriage rail extending parallel to the machine axis along a second side of the base. A stack mold carriage for holding a mold center section, can be slidably mounted on the first and second carriage rails and can be positioned intermediate the fixed and moving platens. An actuator can be coupled to the stack mold carriage for translating the stack mold carriage along the first and second carriage rails towards and away from the stationary platen. The actuator can include a carriage connection portion and a driven member pivotally coupled to the carriage connection portion. The carriage connection portion can be pivotally coupled to the stack mold carriage and can transfer motion from the driven member to translation of the stack mold carriage. The carriage connection portion can be pivotable about a generally vertical pivot axis.

According to another broad aspect of the invention, an injection molding machine can include a base, a stationary platen fixed to the base for holding a first mold section and a moving platen for holding a second mold section. The moving platen can be slidably supported on a slide surface fixed to the base and moveable towards and away from the stationary platen along a machine axis. The moving platen can have a front face generally orthogonal to the machine axis and directed towards the stationary platen, and a rear face opposite the front face and directed away from the stationary platen. At least two lower tie bars can be spaced transversely apart along opposing sides of the machine. At least two upper tie bars can be spaced transversely apart along opposing sides of the machine. Each tie bar can extend parallel to the machine axis, between the stationary and moving platens, for axially clamping together the mold sections during an injection cycle. The injection molding machine can also include a stack mold carriage for holding a mold center section. The injection molding machine can also include an actuator having a driven member having a lower end coupled to the base and an upper end coupled to the rear face of the moving platen, and a carriage connection portion having a front end coupled to the stack mold carriage and a rear end coupled to the driven member intermediate the lower and upper ends.

According to another aspect of the invention, an injection molding machine, comprises: a base; a stationary platen fixed to the base for holding a first mold section; a moving platen for holding a second mold section, the moving platen slidably supported on a platen slide surface fixed to the base and moveable towards and away from the stationary platen along a machine axis; a stack mold carriage for holding a mold center section, the stack mold carriage positioned intermediate the fixed and moving platens; and an actuator coupled to the stack mold carriage for translating the stack mold carriage along the machine axis towards and away from the stationary platen, the actuator comprising a driven member coupled to a carriage connection portion, the carriage connection portion transferring motion from the driven member to translation of the stack mold carriage, and the carriage connection portion joined to the stack mold carriage at an elevation below the platen slide surface.

In some examples, the stack mold carriage comprises a mounting face for connection to the mold center section, and the mounting face may be positioned below the platen slide surface. The injection molding machine may further comprise at least two upper tie bars and at least two lower tie bars, each tie bar extending parallel to the machine axis, between the stationary and moving platens, for axially clamping together the first and second mold sections during an injection cycle.

In some examples, the stack mold carriage may have a first carriage side edge disposed towards the an operator side of the machine, and a second carriage side edge spaced apart from the first side edge in a generally horizontal direction perpendicular to the machine axis and towards a non-operator side of the machine, and the carriage connection portion may be positioned laterally between the first and second carriage side edges. The carriage connection portion may be positioned at an elevation below the lower tie bars. The stationary platen may include a sprue hole generally centrally located of the stationary platen, and the machine axis passes through the center of the sprue hole, and wherein the mounting face extends laterally across the machine axis from a front edge disposed toward an operator side of the injection molding machine to a back edge disposed toward a non-operator side of the injection molding machine.

In some examples, the mounting face may be positioned at an elevation below the lower tie bars. The mounting face may be disposed in a generally horizontal plane. The mold center section may have upper and lower edges, and the carriage connection portion may be disposed below lower edge. The mold center section may have upper and lower edges, and the stack mold carriage may be connected to the lower edge.

In some examples, the injection molding machine may further comprise a pair of stack mold carriage rails along which the stack mold carriage is slidable. The platen slide surface may be defined by a pair of platen rails on opposed sides of the base, and the stack mold carriage rails may be separate from, and positioned laterally inboard of, the platen rails.

In some examples, the base may have an inner cavity, and the carriage connection portion may be nested within the inner cavity. The stack mold carriage may be nested within the inner cavity. The stack mold carriage may have an axial extent that is less than the lateral spacing between the tie bars, the stack mold carrier removable from the machine by rotating (for example by 90 degrees about a generally vertical axis) and lifting the stack mold carrier through the lateral spacing between the tie bars.

In some examples, the driven member may be laterally offset from the machine axis. The driven member may be driven by the moving platen. The driven member may comprise at least a first link coupled to the moving platen and rotated by movement of the moving platen, and the carriage connection portion may comprise at least a second link coupled between the first link and the stack mold carriage and translatable by rotation of the first link.

In some examples, the actuator may translate the stack mold carriage independently of the movement of the moving platen. The carriage connection portion may, in some examples, comprise a ball screw.

According to yet another aspect of the invention, an injection molding machine, comprises: a base; a stationary platen fixed to the base for holding a first mold section; a moving platen for holding a second mold section, the moving platen slidably supported on a platen slide surface fixed to the base and moveable towards and away from the stationary platen along a machine axis; a stack mold carriage for holding a mold center section, the stack mold carriage positioned intermediate the fixed and moving platens; and an actuator coupled to the stack mold carriage for translating the stack mold carriage along the machine axis towards and away from the stationary platen, the actuator having a single carriage connection portion and a driven member coupled to the carriage connection portion, the carriage connection portion transferring motion from the driven member to translation of the stack mold carriage, and the carriage connection portion laterally offset relative to the machine axis.

In some examples, the machine may comprise at least a lower front tie bar disposed towards an operator side of the machine, and at least a lower rear tie bar spaced horizontally apart from the lower front tie bar in a direction towards a non-operator side of the machine by a tie bar spacing, the actuator laterally positioned generally vertically below and at least partially in vertical registration with one of the lower front and rear tie bars. The actuator may be laterally positioned generally vertically below and at least partially in vertical registration with the lower front tie bar.

In some examples, the carriage connection portion may be joined to the stack mold carriage at an elevation below the platen slide surface. The platen slide surface may comprise a front platen rail and a rear platen rail each extending parallel to the machine axis and spaced apart on laterally opposite sides of the machine axis, and the carriage connection portion may be laterally intermediate the front and rear platen rails. The machine may comprise a front and a rear carriage rail, the carriage rails slidably supporting the stack mold carriage. The front and rear carriage rails may be disposed laterally intermediate the front and rear platen rails. The front and rear carriage rails may be disposed at an elevation below the front and rear platen rails. The carriage connection portion may be disposed at an elevation between that of the carriage rails and the platen rails. The stack mold carriage may comprise a mounting face for bearing against, and attachment to, the mold center section, the mounting face disposed in a generally horizontal plane at an elevation below that of the platen slide surface.

According to yet another aspect of the invention, an injection molding machine comprises: a base; a stationary platen fixed to the base for holding a first mold section; a moving platen for holding a second mold section, the moving platen slidably supported on a slide surface fixed to the base and moveable towards and away from the stationary platen along a machine axis, the moving platen having a front face generally orthogonal to the machine axis and directed towards the stationary platen, and a rear face opposite the front face and directed away from the stationary platen; at least two lower tie bars spaced transversely apart along opposing sides of the machine, and at least two upper tie bars spaced transversely apart along opposing sides of the machine, each tie bar extending parallel to the machine axis, between the stationary and moving platens, for axially clamping together the mold sections during an injection cycle; a stack mold carriage for holding a mold center section; and an actuator comprising a driven portion having a lower end coupled to the base and an upper end coupled to the rear face of the moving platen, and a carriage connection portion having a front end coupled to the stack mold carriage and a rear end coupled to the driven portion intermediate the lower and upper ends.

In some examples, the driven portion may comprise at least a first link, the lower end of the driven portion may be disposed adjacent an end of the first link, and the first link may be pivotable relative to the base about a first pivot axis. The first pivot axis may be in a fixed position relative to the base.

DRAWINGS

Reference is made in the detailed description to the accompanying drawings, in which.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any invention disclosed in an apparatus or process described below and for which an exclusive right is not granted by issuance of this patent application may be the subject matter of another protective instrument, for example, a continuing patent application, and the applicants, inventors or owners do not intend to abandon, disclaim or dedicate to the public any such invention by its disclosure in this document.

Figure 1:
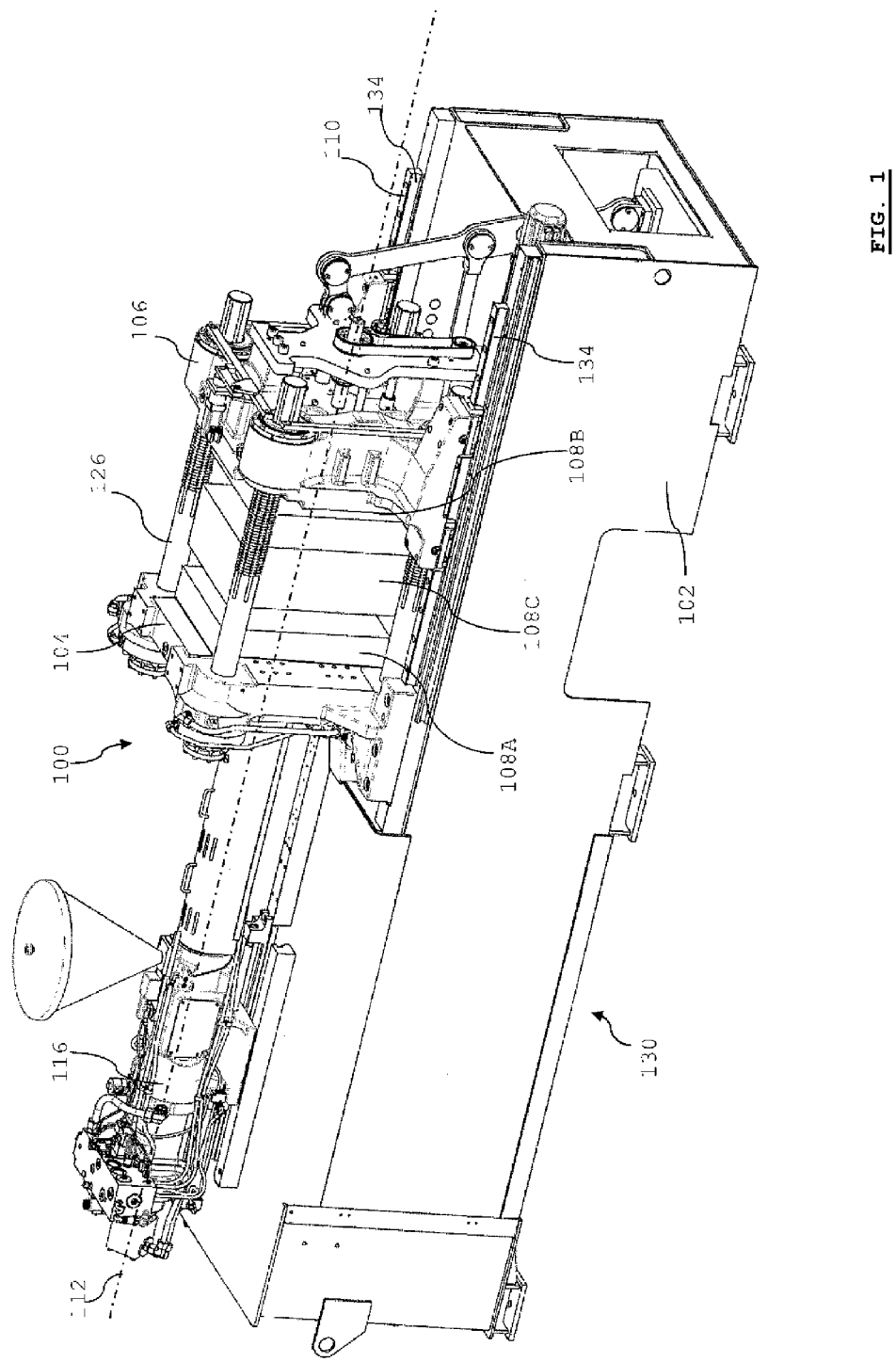
FIG. 1 is a perspective view of an injection molding machine.
Figure 2:
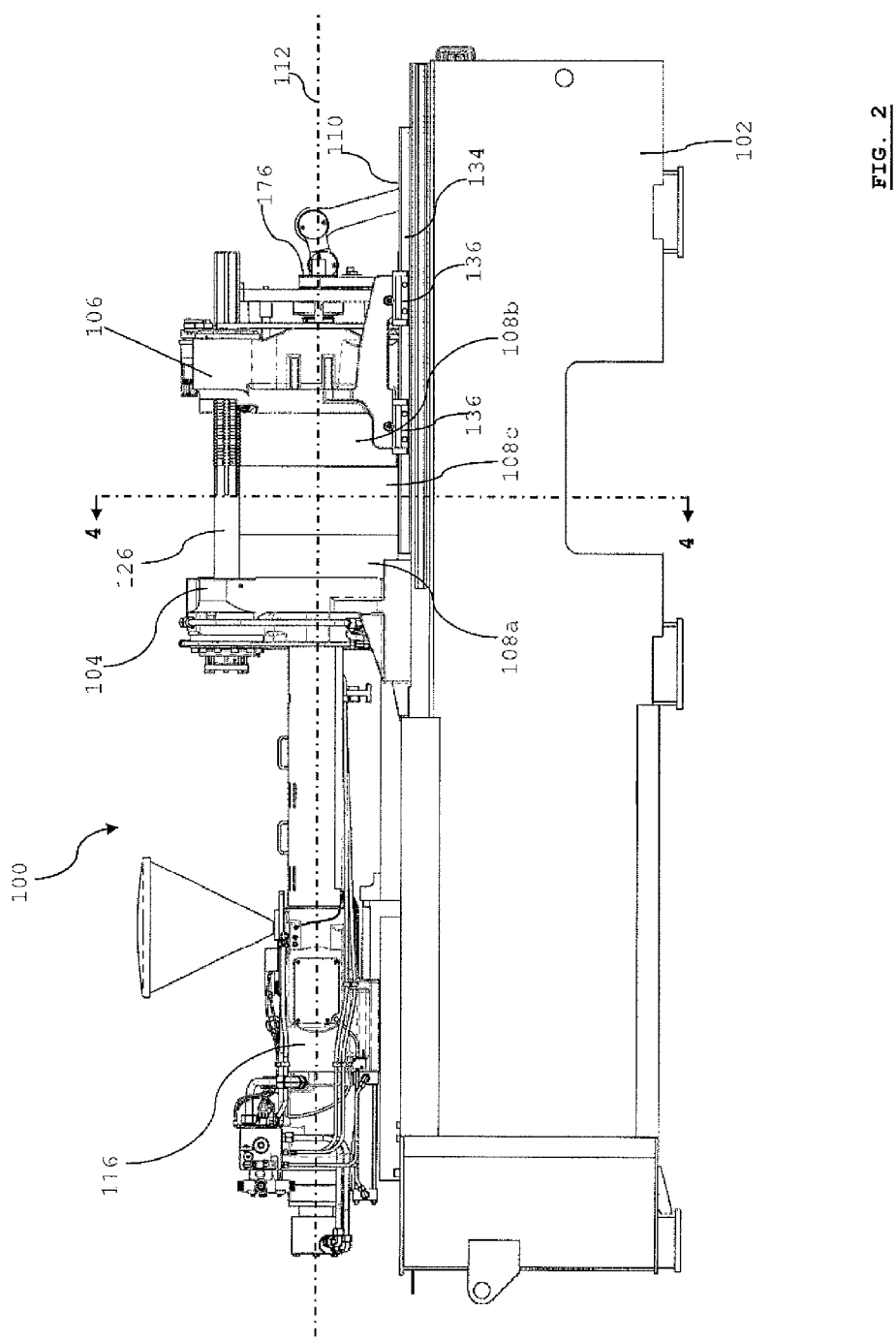
FIG. 2 is a front view of the machine of FIG. 1, as viewed from the operator side of the machine.

Referring to FIGS. 1 and 2, an injection molding machine 100 includes a base, a stationary platen 104 fixed to the base 102 for holding a first mold section 108a, and a moving platen 106 for holding a second mold section 108b. The moving platen 106 is slidably supported on a platen slide surface 110 fixed to the base 102, and is moveable towards and away from the stationary platen 104 along a machine axis 112. In the example illustrated, the stationary platen 104 includes a sprue hole 114 generally centrally located of the stationary platen 104, and the machine axis 112 passes through the center of the sprue hole 114. An injection unit 116 is supported on the base 102 and injects resin (or another injection compound) into mold cavities formed by the mold sections 108.

Figure 5:
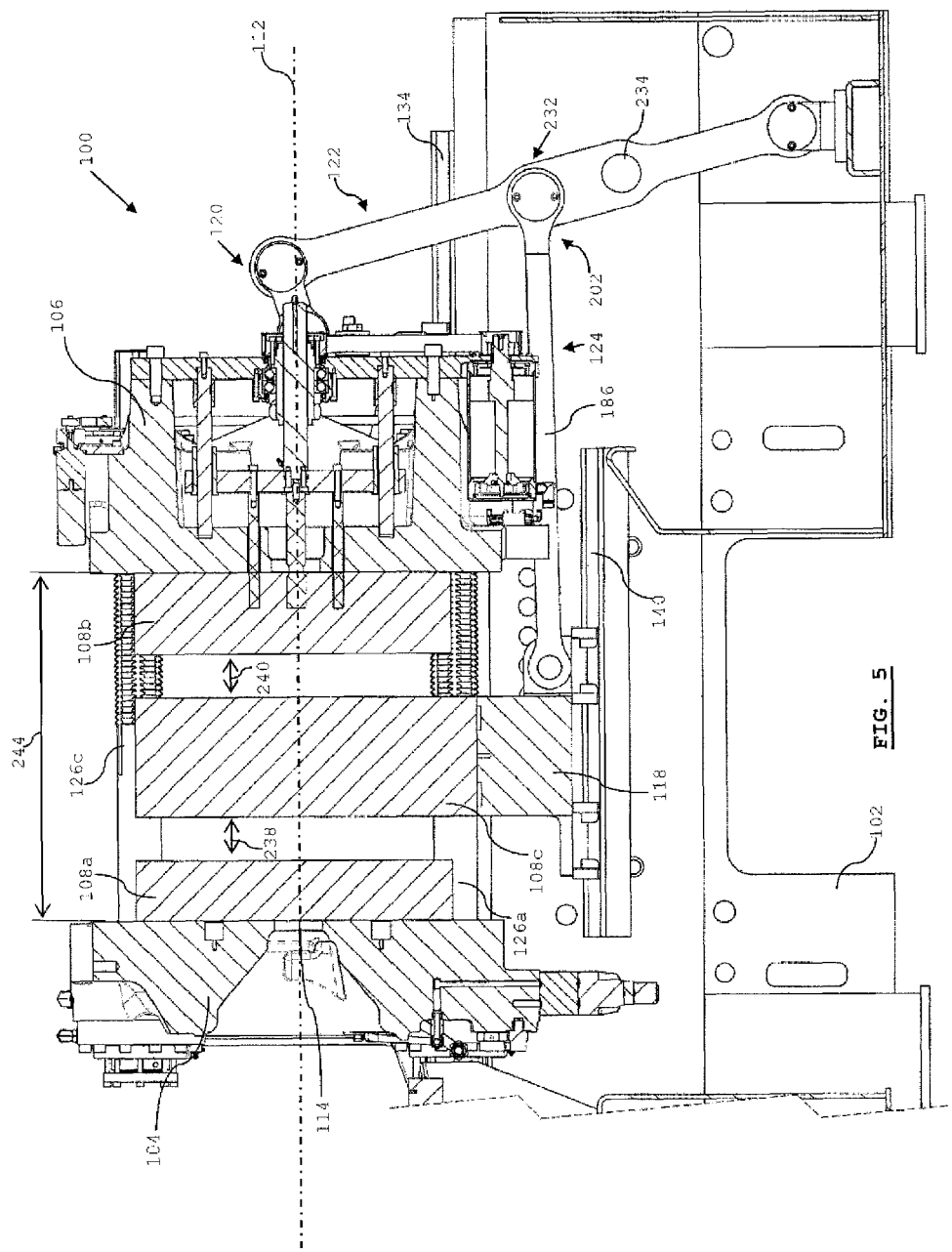
FIG. 5 is a section view of the machine of FIG. 3, taken along the line 5-5.

With further reference to FIG. 5, the machine 100 further includes a stack mold carriage 118 for holding a mold center section 108c, the stack mold carriage 118 positioned axially intermediate the fixed and moving platens 104, 106. An actuator 120 is coupled to the stack mold carriage 118 for translating the stack mold carriage 118 along the machine axis 112 towards and away from the stationary platen 104. The actuator 120 includes a driven member 122 coupled to a carriage connection portion 124, the carriage connection portion 124 transferring motion from the driven member 122 to translation of the stack mold carriage 118.

Figure 3:
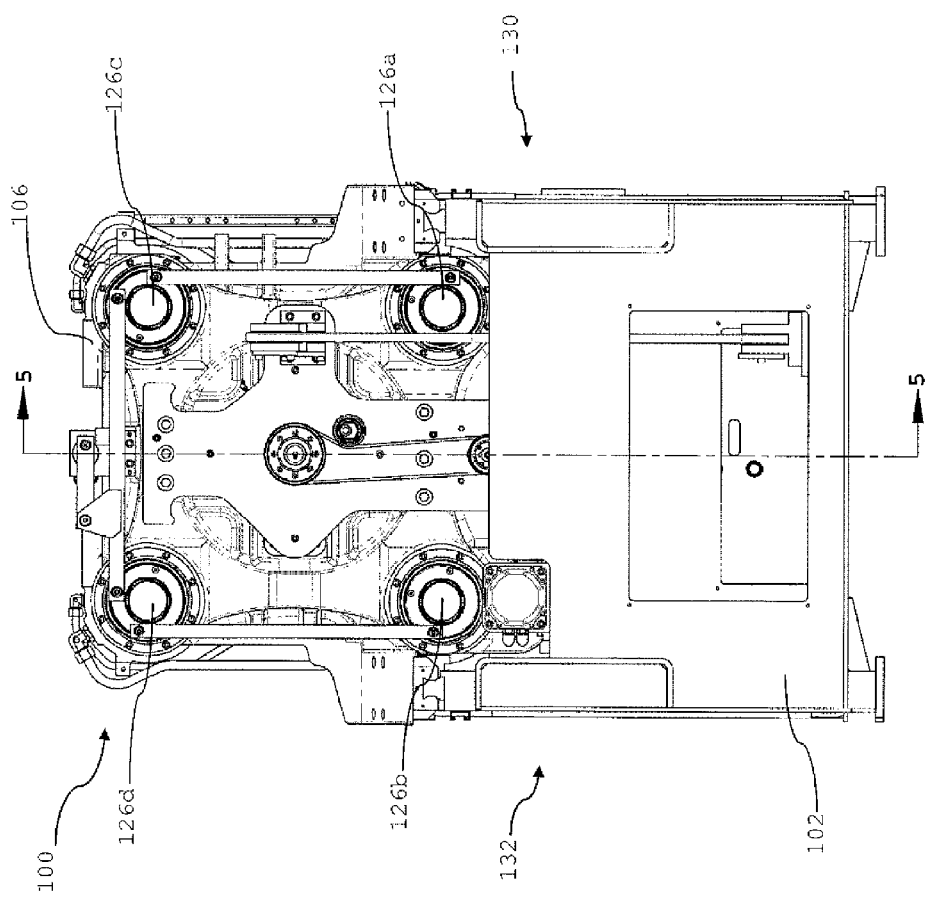
FIG. 3 is an end view of the machine of FIG. 2, as viewed in the direction of arrows 3.

With reference also to FIG. 3, the machine 100 may further include a plurality of tie bars 126 extending parallel to the machine axis 112 and between the stationary and moving platens 104, 106, for axially clamping together the mold sections 108 during an injection cycle (clamped position shown in FIG. 2). In the example illustrated, the machine 100 includes a front lower tie bar 126a and a rear lower tie bar 126b spaced transversely apart (by a lateral tie bar spacing 128—FIG. 4) along opposing sides of the machine 100. The front lower tie bar 126a is, in the example illustrated, disposed towards an operator side 130 of the machine 100, and the rear lower tie bar 126b is disposed towards a non-operator side 132 of the machine 100 with the machine axis 112 positioned laterally intermediate the front and rear lower tie bars 126a, 126b. The machine 100 may further include a front upper tie bar 126c spaced vertically above the front lower tie bar 126a, and a rear upper tie bar 126d spaced vertically above the rear lower tie bar 126b.

The platen slide surface 110 may comprise a pair of platen rails 134 positioned on laterally opposed sides of the base 102 and extending parallel to the machine axis 112. In the example illustrated, the moving platen 106 includes platen bearing shoes 136 (FIG. 2) fixed to the moving platen 106 and slidably engaged with the platen rails 134.

Figure 4:
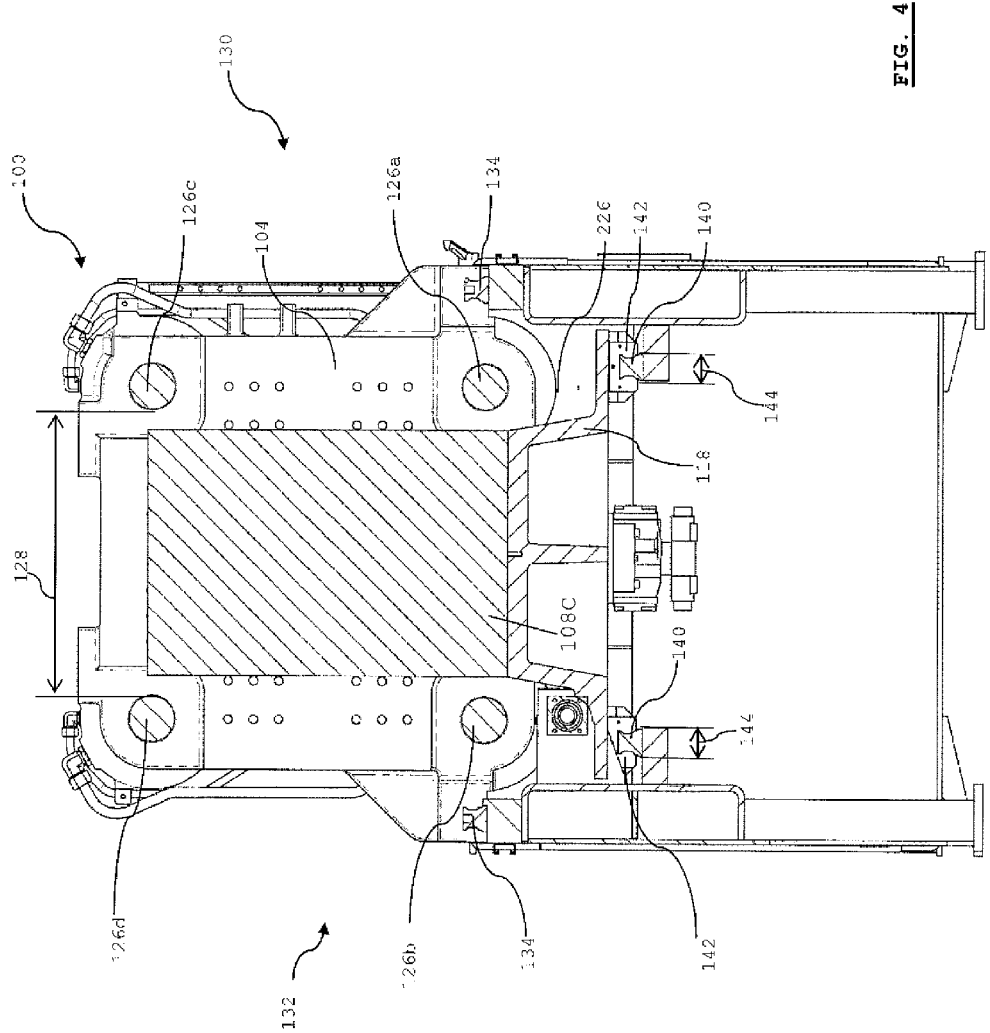
FIG. 4 is a cross-sectional view of the machine of FIG. 2 taken along the line 4-4.

Referring to FIG. 4, the machine 100 further comprises, in the example illustrated, a pair of stack mold carriage rails 140 along which the stack mold carriage 118 is slidable. The stack mold carriage 118 may be provided with carriage shoes 142 slidably engaged with the carriage rails. In the example illustrated, the stack mold carriage rails 140 are separate from, and positioned laterally inboard of, the platen rails 134. The carriage rails 140 are also, in the example illustrated, positioned at an elevation below that of the platen rails 134.

Figure 6:
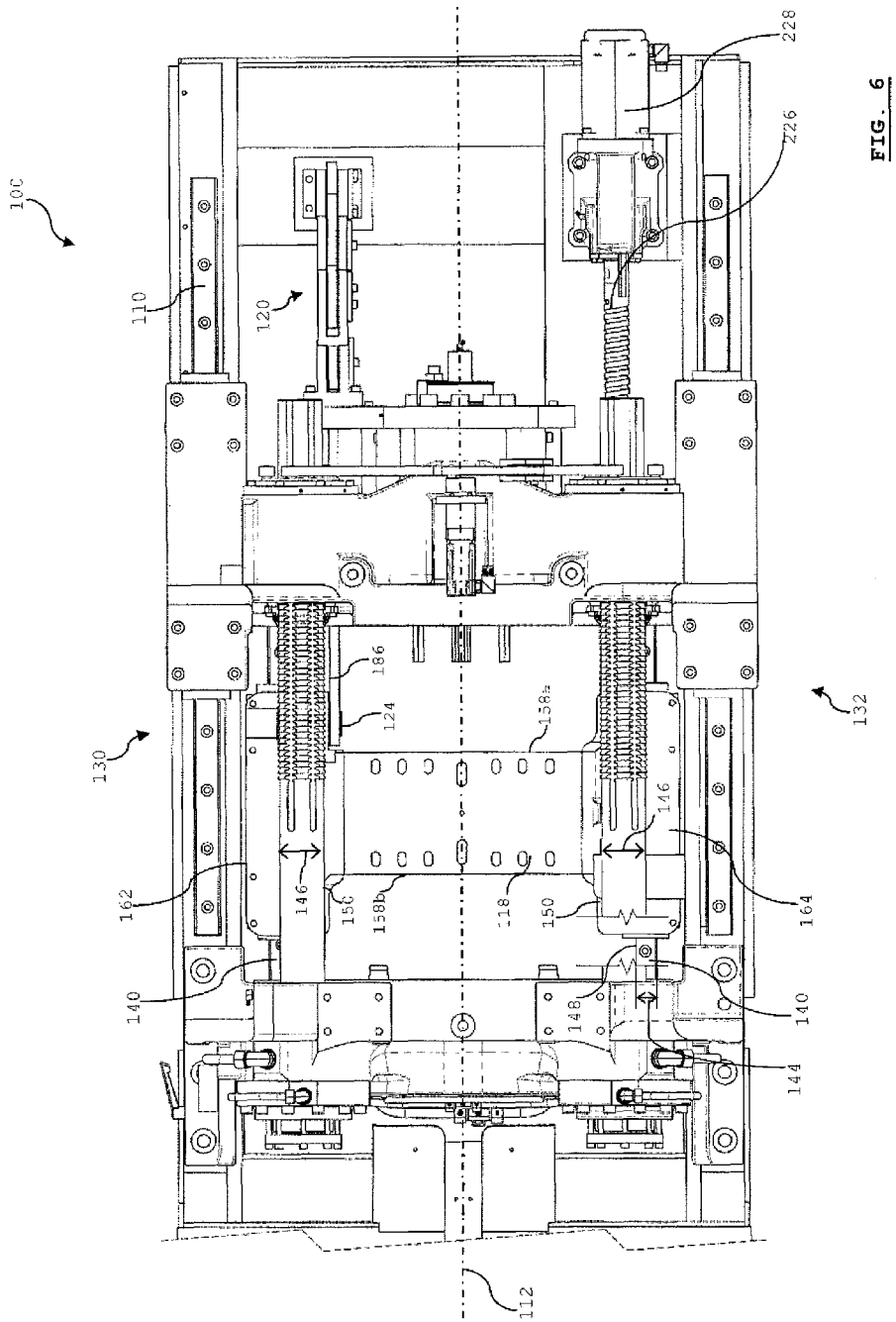
FIG. 6 is a top view of a portion of the machine of FIG. 2.
Figure 7:
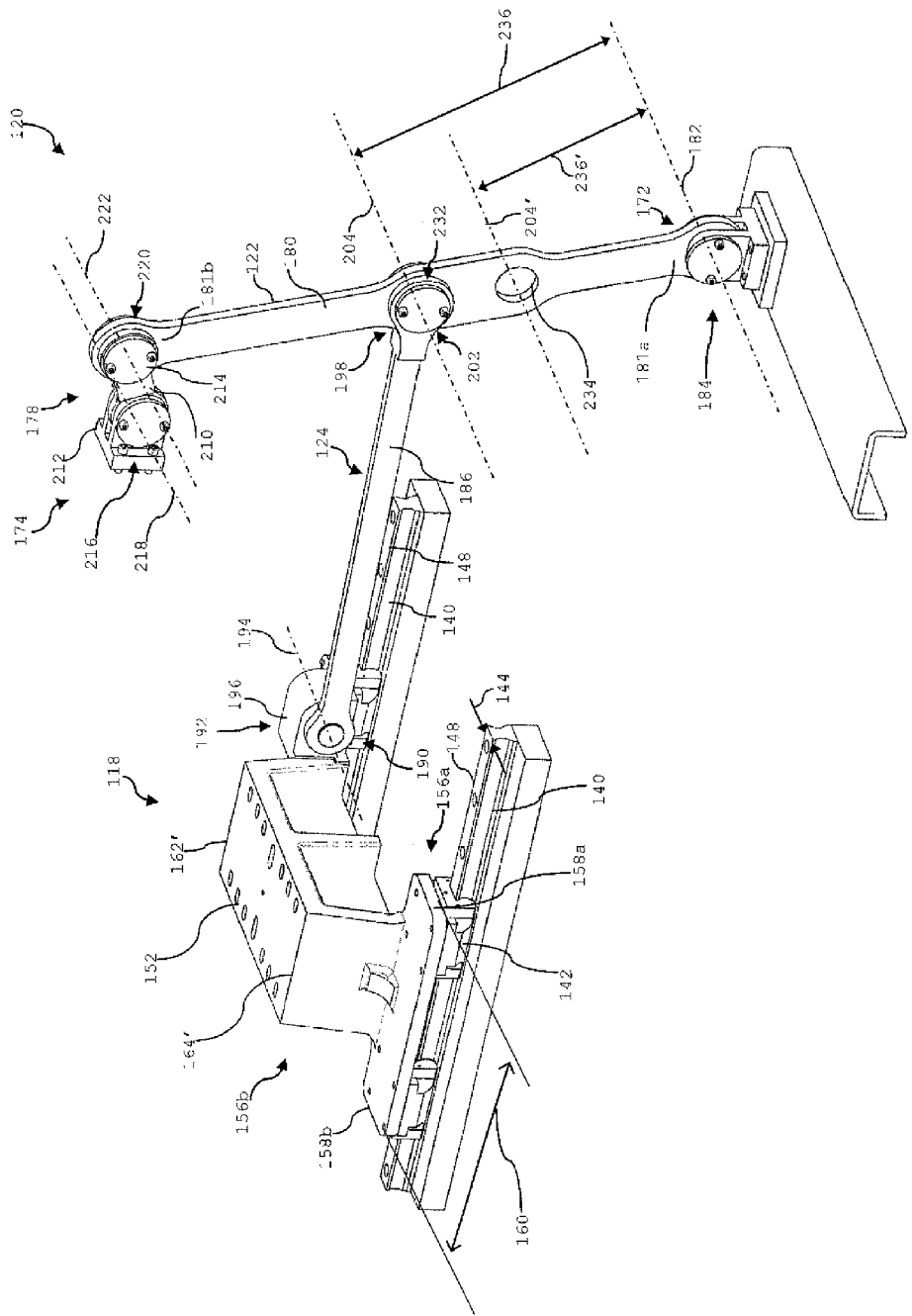
FIG. 7 is a perspective view of a subassembly of the machine of FIG. 1, including an actuator and a stack mold carriage.

Referring also to FIGS. 6 and 7, in the example illustrated, the carriage rails 140 each have a lateral width 144 that is at least partially overlapped by the width (diameter) 146 of the tie bars when viewed from above (a portion of tie bars 126b and 126d has been cut away for clarity), and laterally inboard edges 148 of the carriage rails are positioned no further inboard than laterally innermost surfaces 150 of the tie bars 126 when viewed from above. This can help to provide increased clearance between and below the tie bars 126a, 126b, which can be advantageous for various reasons, including, for example, optional part ejection from the molds by, for example, dropping molded parts onto a conveyor situated below the platens.

With reference to FIGS. 6 and 7, the stack mold carriage 118 may comprise a mounting face 152 against which a bottom surface of the mold center section 108c may bear, and to which the mold center section 108c can be attached. In the example illustrated, the mounting face 152 is generally horizontal and comprises an upper surface of the stack mold carriage 118. The mounting face 152 is, in the example illustrated, positioned at an elevation below that of the platen slide surface 110. The mounting face extends, in the example illustrated, laterally across the machine axis 112 from a mounting face front edge 162' disposed toward an operator side of the injection molding machine to a mounting face back edge 164' disposed toward a non-operator side of the injection molding machine.

The stack mold carriage 118 generally has an axially outer end 156a facing the moving platen (and the actuator 120 attached thereto), and an axially inner end 156b opposite the axially outer end 156a, the axially inner end 156b facing the stationary platen 104. The stack mold carriage 118 has an axial extent 160 that is defined by inner and outer axial edges 158a, 158b of the respective ends 156a, 156b. The stack mold carriage 118 has first and second side edges 162, 164 generally parallel to the machine axis 112 and connecting together the axial end edges 158a, 158b, with the first side edge 162 disposed towards the operator side 130 of the machine, and the second side edge 164 disposed towards the non-operator side 132 of the machine.

Figure 8:
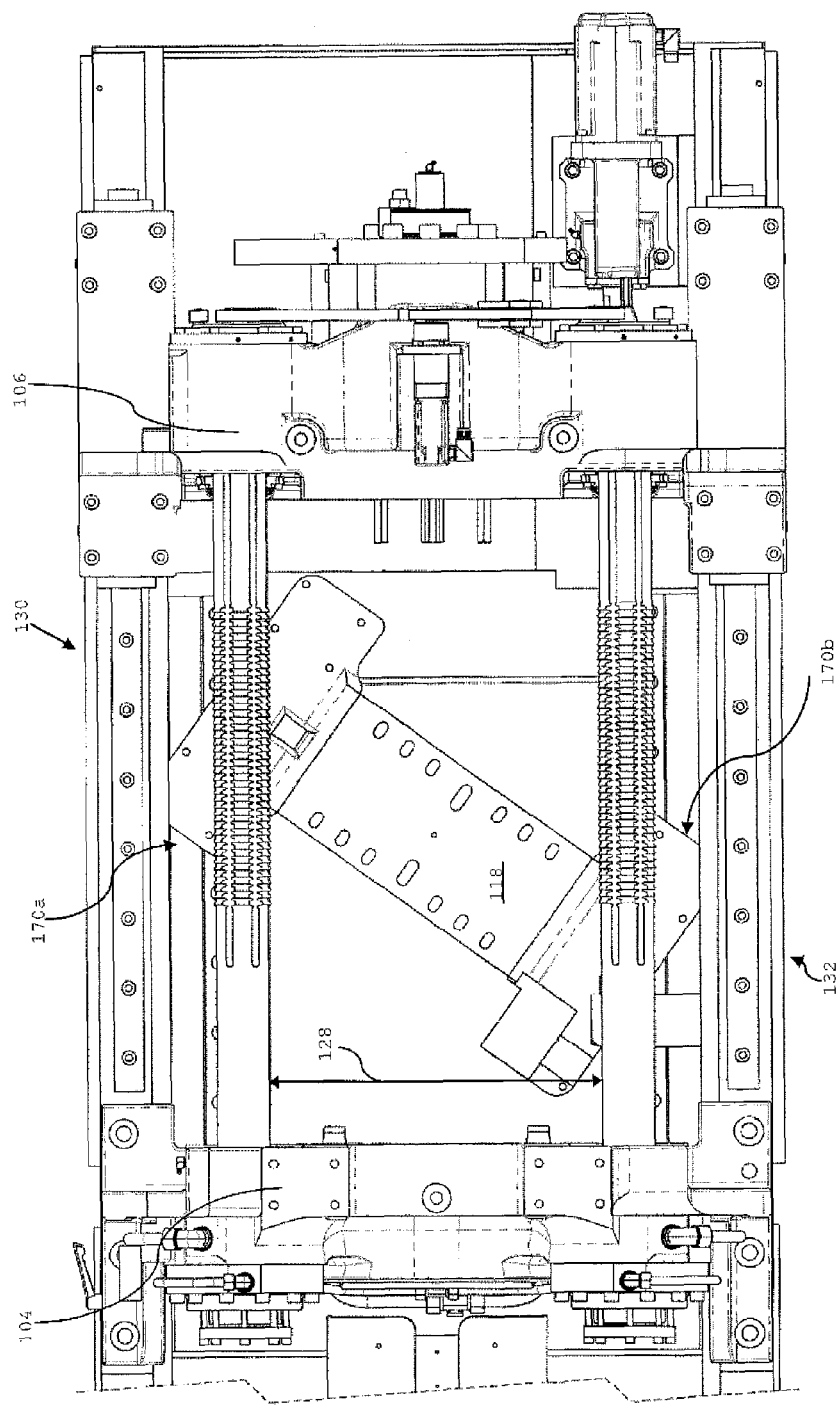
FIG. 8 is a top view of the portion of the machine of FIG. 2, showing a stack mold carriage partially rotated between an in-use position and an insertion/removal position.
Figure 9:
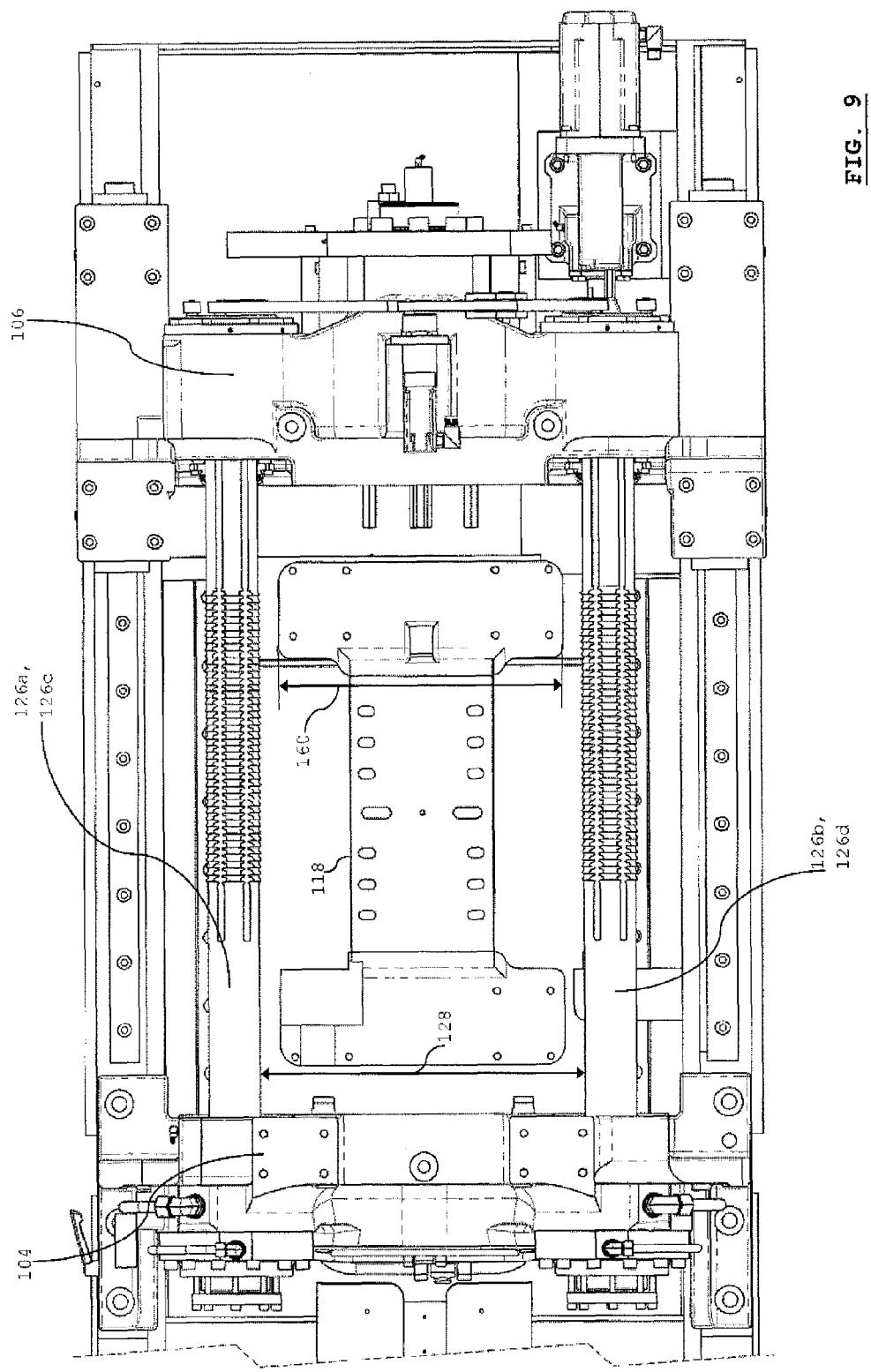
FIG. 9 is a top view similar to FIG. 8, showing the stack mold carriage rotated to the insertion/removal position.
Figure 10:
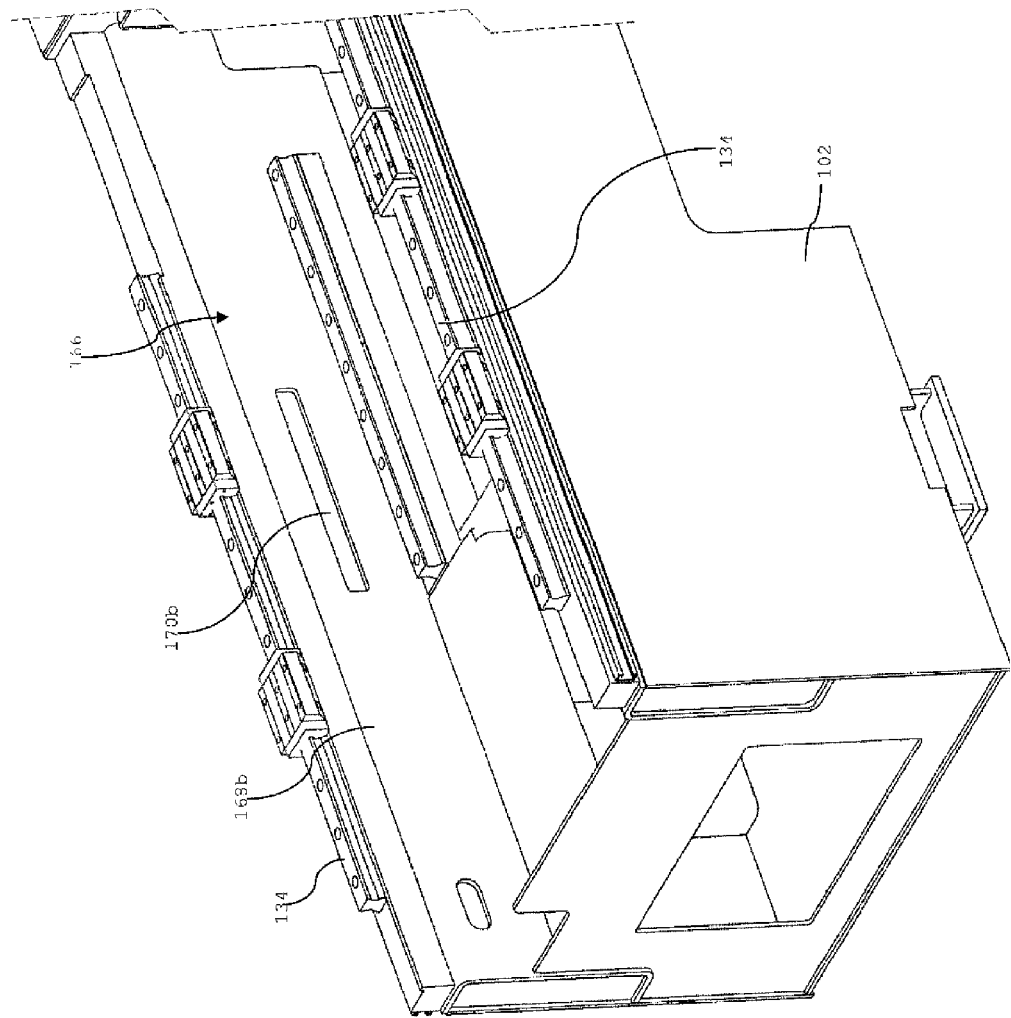
FIGS. 10 and 11 are perspective views of a portion of the base of the machine of FIG. 1, shown from the operator and non-operator side, respectively.
Figure 11:
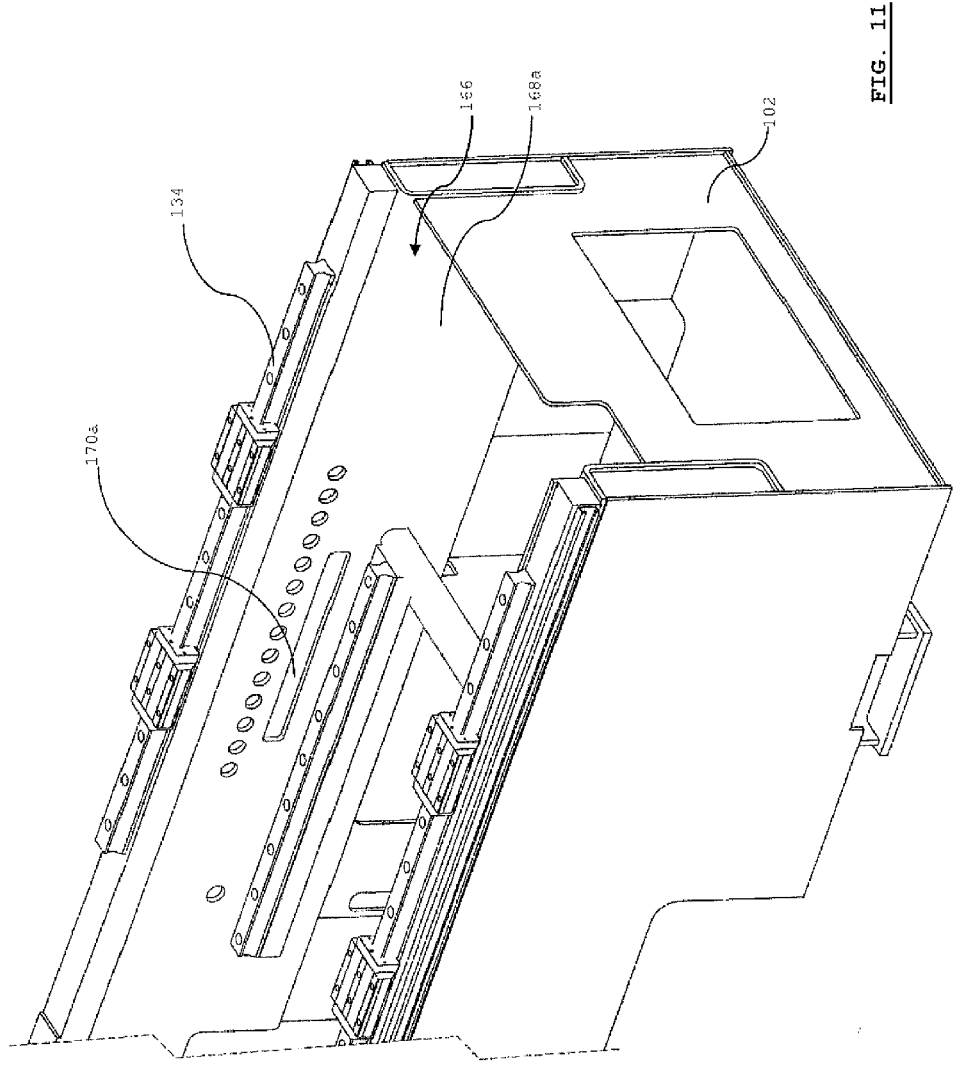

The axial extent 160 of the stack mold carriage 118 is, in the example illustrated, less than the lateral tie bar spacing 128 between the front and rear tie bars 126a, 126b. This can facilitate removal of the carriage 118 from the machine by, for example, releasing the carriage bearing shoes 142 from the carriage 118, rotating the carriage (by about 90 degrees, in the example illustrated), and lifting the carriage 118 through the lateral tie bar spacing 128 between the front and rear tie bars 126a, 126b (see FIGS. 8 and 9). In the example illustrated, the base 102 of the machine has a generally hollow central portion defining a base cavity 166, and the carriage 118 is nested within the cavity 166 (FIGS. 10 and 11). The cavity 166 extends laterally between opposed generally vertical sidewalls 168a, 168b (on the operator and non-operator sides 130, 132, respectively), and the sidewalls 168a, 168b may include respective slots 170a, 170b for receiving corner portions of the carriage 118 when rotated for removal.

Installation of the stack mold carriage can be generally carried out in reverse of removal, i.e. lowering the carriage through the lateral tie bar spacing with the axial ends generally aligned in parallel with the machine axis, and then when at the desired elevation (e.g. at an elevation where outer corners of the carriage are in registration with the elevation of the slots 170a, 170b), rotating the carriage approximately 90 degrees about a generally vertical axis) to align the carriage 118 axially for attachment to the carriage shoes. The carriage shoes can then be secured to the carriage. The relative elevations of the slots and carriage rails may be positioned so that further lowering of the carriage 118 after rotation and before attachment of the carriage shoes is required.

Further describing the actuator 120, with reference again to FIG. 7, the driven member 122 of the actuator 120 may be driven by translation of the moving platen 106. The driven member 122 of the actuator 120 may have a lower end 172 coupled to the base 102 and an upper end 174 coupled to the rear face 176 (FIG. 2) of the moving platen 106. A take-up joint 178 may be provided adjacent at least one end 172, 174 of the driven member 122 to facilitate linear translation of the upper end 174 (following the path of the moving platen 106) relative to pivoting motion of the lower end 172.

In the example illustrated, the driven member 122 comprises at least a first link 180 coupled to the base 102, the first link 180 urged to pivot relative to the base 102 by movement of the moving platen 106. The first link 180 is generally elongate, extending between a lower first link end 181a and an upper first link end 181b. The lower end 172 of the driven member 122 is, in the example illustrated, disposed adjacent the lower first link end 181a end of the first link 180. The first link 180 is pivotable relative to the base 102 about a generally horizontal first pivot axis 182, the first pivot axis defined by a first pivot joint 184 that is, in the example illustrated, in fixed position relative to the base 102.

The carriage connection portion 124 generally couples the driven member 122 to the stack mold carriage 118 for transferring motion from the driven member 122 to translation of the stack mold carriage 118. The carriage connection portion 124 may be joined to the stack mold carriage 118 at an elevation below that of the platen slide surface 110, and/or may be joined to the stack mold carriage 118 at an elevation below that of the lower tie bars 126a, 126b. The machine 100 may comprise a single actuator 120, with the carriage connection portion 122 providing the lone motion-transferring connection between the driven member 122 and the carriage 118. The carriage connection portion 122 may be positioned laterally offset from the machine axis 112, and may be positioned generally vertically below and at least in partial vertical registration with one of the front and rear lower tie bars 126a, 126b. The carriage connection portion 122 may be positioned laterally between the first and second carriage side edges 162, 164.

The carriage connection portion 124 comprises, in the example illustrated, at least a second link 186 coupled between the first link 180 and the stack mold carriage 118. The second link has a width that is at least partially overlapped by the width (diameter) 146 of the front lower tie bar 126a (see FIG. 6). The second link 186 has an inboard side surface 188 facing towards the machine axis 112, and the inboard side surface 188, in some examples, extends no further inboard than the laterally innermost side surface 150 of the front lower tie bar 126a. In such examples, the carriage connection portion 124 is positioned substantially completely in vertical registration with the lower front tie bar 126a, so that the connection portion 124 is generally concealed by the front lower tie bar 126a when viewed from above.

The second link 186 has a proximal end 190 pivotably joined to the stack mold carriage 118 at a carriage pivot joint 192 defining a generally horizontal carriage joint pivot axis 194 about which the second link can pivot relative to the carriage. The stack mold carriage 118 is, in the example illustrated, provided with a joint housing 196 for housing the carriage pivot joint 192. In the example illustrated, the carriage joint axis 194 is positioned at an elevation above that of the carriage rails 140 and below that of the mounting face 152.

The second link 186 has, in the example illustrated, a distal end 198 spaced apart from the proximal end 190. The distal end 198 is coupled to the driven member 122 at a distal pivot joint 202 defining a generally horizontal distal pivot joint axis 204. The distal pivot joint 202 is located at a position along the length of the first link intermediate the lower and upper ends 181a, 181b.

In the example illustrated, the driven member 122 includes a take-up joint 178 comprising a third link 210 having a platen end 212 and a link end 214 opposite the platen end 212. The platen end 212 is pivotably coupled to the rear face 176 of the moving platen 106 (FIG. 1) at a platen pivot joint 216 defining a generally horizontal platen pivot joint axis 218. The link end 214 of the third link 210 is coupled to the first link 180 at a link pivot joint 220 defining a generally horizontal link joint pivot axis 222. The take-up joint 178 may, in some examples, comprise one or more other structural features for accommodating the difference in the linear path of the carriage compared to the arc path of the first link. For example, the tracking joint may comprise a sliding member that is slidable in a radial direction along a portion of the length of the first link, with the platen pivot joint attached to, and slidable with, the sliding member.

In use, the moving platen is translated between a retracted (mold-open) position (shown in FIG. 1) and an advanced (mold-closed) position (shown in FIG. 2). The motive force for translating the moving platen can be provided by a platen actuator, such as, for example, a ball screw 226 driven by a servo motor 228 (see FIG. 6). Translation of the moving platen 106 from the retracted to advanced positions causes corresponding translation of the platen pivot joint 216 with the platen end 212 of the third link 210 coupled thereto. The third link 210 carries the link pivot joint 220 with the moving platen 106, so that the first link 180 is urged to pivot about the pivot axis 182. The pivoting or rotation of the first link 180 pushes the second link 186 towards the advanced position (towards the left in FIG. 2), moving the stack mold carriage 118 towards the left (closed position) by a corresponding amount.

Changing the location of the distal pivot joint 202 along the length of the first link 180 can change the relative spacing (when in the mold open position) between the first mold section 108a and the mold center section 108c on one side of the mold center section, and the second mold section 108b and the mold center section 108c on the opposite side of the mold center section. This can facilitate molding articles having different axial lengths on respective sides of the mold center section 108c during a single injection cycle (and/or in particular, molding articles having a relatively long length on one side of the mold center section 108c). In the example illustrated, the first link 180 of the driven member 122 includes a first joint aperture 232 and an optional second joint aperture 234 (see FIGS. 5 and 7) spaced apart from each other along the length of the first link 180. The distal pivot joint 202 (for connection to the second link 186) can be positioned at either one of the first or second joint apertures 232, 234.

Figure 12:
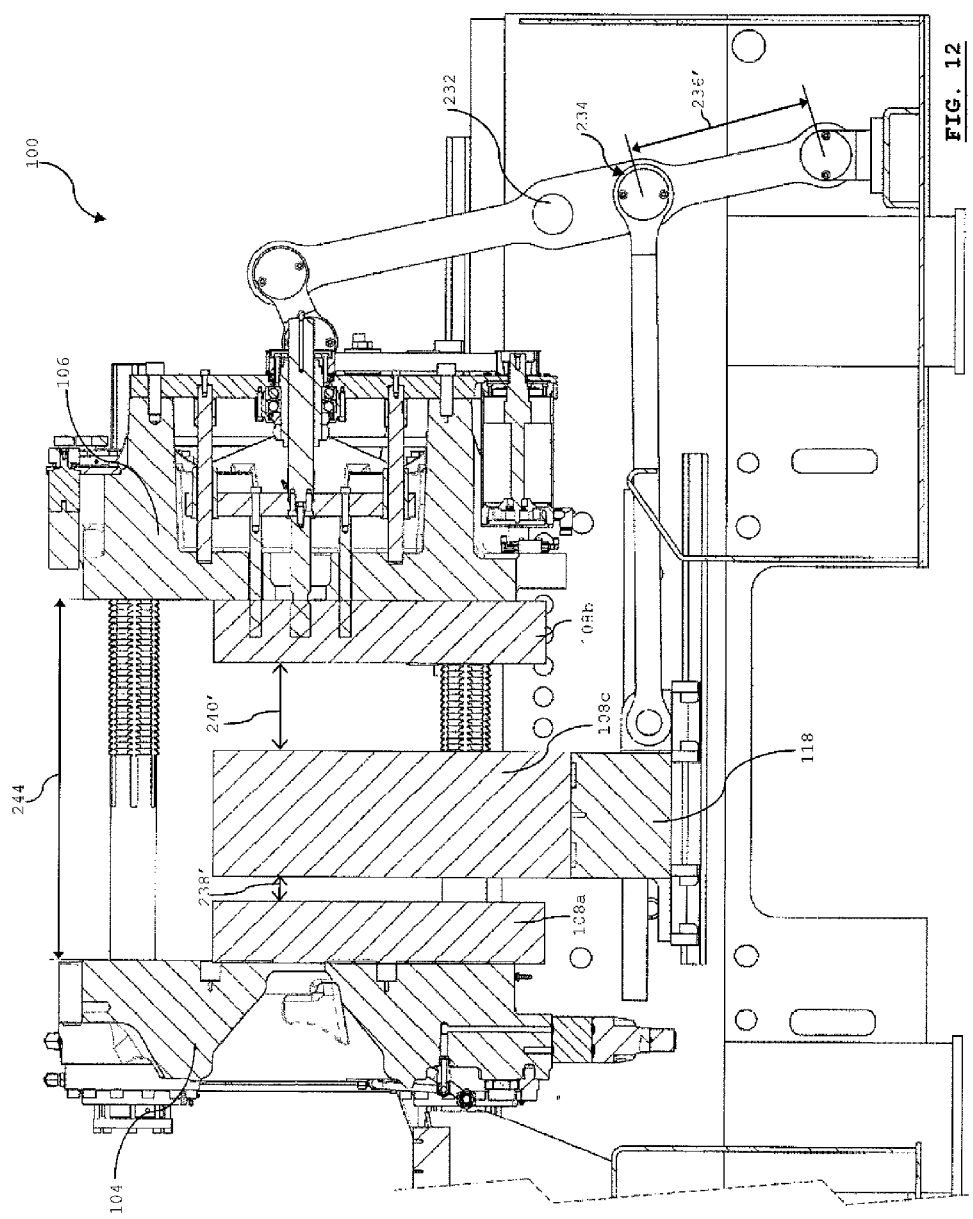
FIG. 12 is a cross-sectional elevation view of the machine generally corresponding to that of FIG. 4, with an actuator linkage assembled in a second configuration.

When the distal pivot joint 202 is mounted at the first joint aperture 232, the distal pivot axis 204 is spaced apart from the first pivot axis 182 by a first radial length 236 (FIG. 7). In the example illustrated, this first radial length corresponds to first and second mold gaps 238, 240 (between the first mold section 208a and the mold center section 108c, and between the mold center section 108c and the second mold section 208b, respectively that are approximately equal in axial extent (FIG. 5). When the distal pivot joint 202 is mounted at the second joint aperture 234, the distal pivot axis (identified at 204' for clarity) is spaced apart from the first pivot axis 182 by a second radial length 236' (FIG. 12). In the example illustrated, this second radial length 236' is less than the first radial length 236 and corresponds to first and second mold gaps 238', 240' (between the first mold section 108a and the mold center section 108c, and between the mold center section 108c and the second mold section 108b, respectively) that are different in axial extent. In the example illustrated, the first mold gap 238' is about half the size of the second mold gap 240'. The fully open spacing 244 between stationary and moving platens 104, 106 is the same in either configuration.

Figure 13:
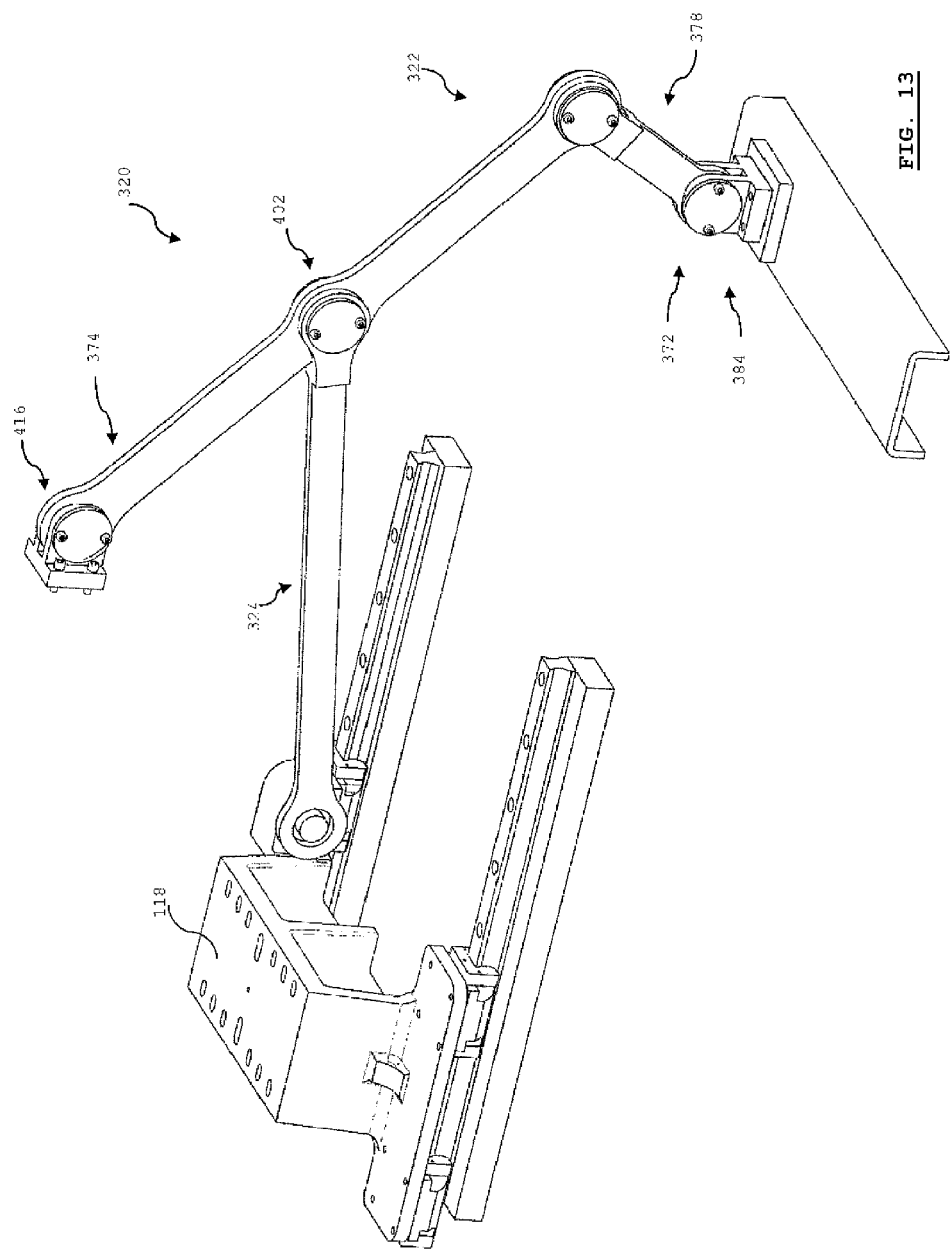
FIG. 13 is a perspective view of an alternate example of the subassembly shown in FIG. 7.

Referring to FIG. 13, another example of an actuator 320 is shown. The actuator 320 is similar to the actuator 120 and like features are identified by like reference characters, incremented by 200. The actuator 320 has a driven member 322 with a lower end 372 coupled to the base 102 and an upper end 374 coupled to the rear face 176 (FIG. 2) of the moving platen 106. A take-up joint 378 is provided adjacent the lower end 372 of the driven member 322 to facilitate linear translation of the upper end 374 (following the path of the moving platen 106) relative to pivoting motion of the lower end 372.

Figure 14:
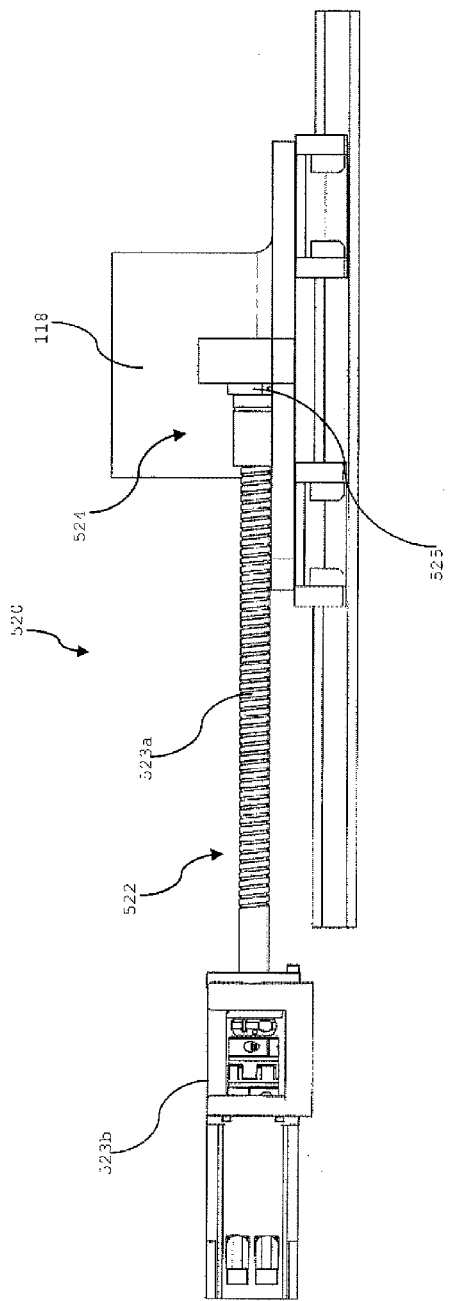
FIGS. 14 and 15 are elevation views of an alternate actuator shown in advanced and retracted positions, respectively.
Figure 15:
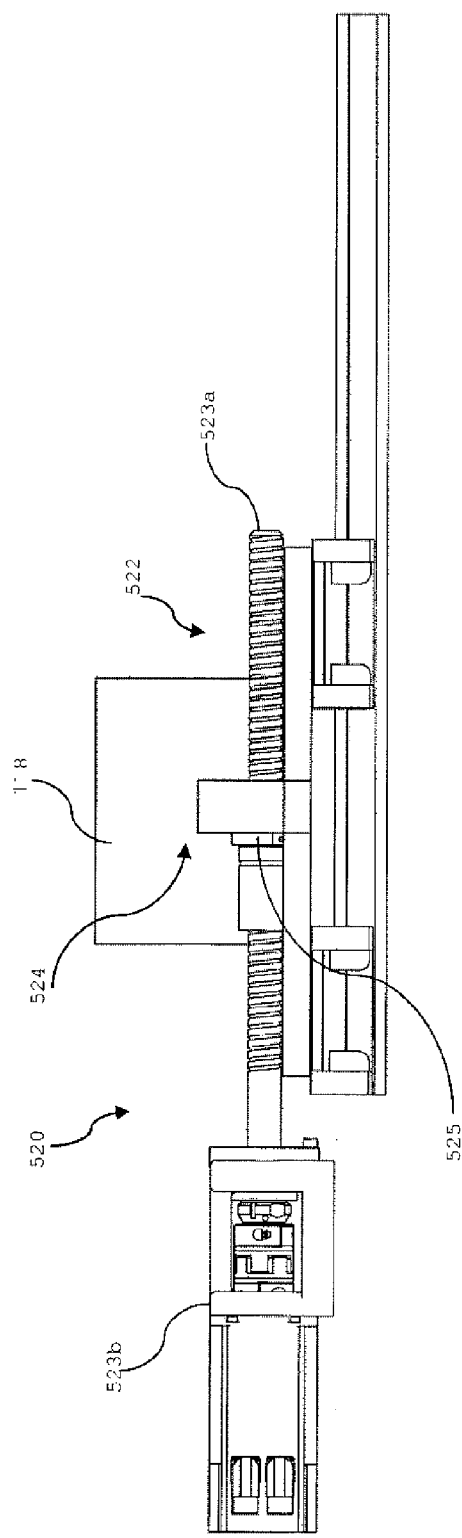

Referring to FIGS. 14 and 15, another example of an actuator 520 is shown. The actuator 520 has some similarities to the actuator 120, and like features are identified by like reference characters, incremented by 400. The actuator 520 comprises a driven member 522 in the form of a ball screw 523a driven by, for example, a servo motor 523b. The actuator 520 further comprises a driven member 524 in the form of ball nut 525 rotatably engaged with the ball screw 523a and fixed to the carriage 118 for moving axially therewith. In this configuration, the actuator 520 may translate the stack mold carriage 118 independently of the movement of the moving platen 106.

Figure 16:
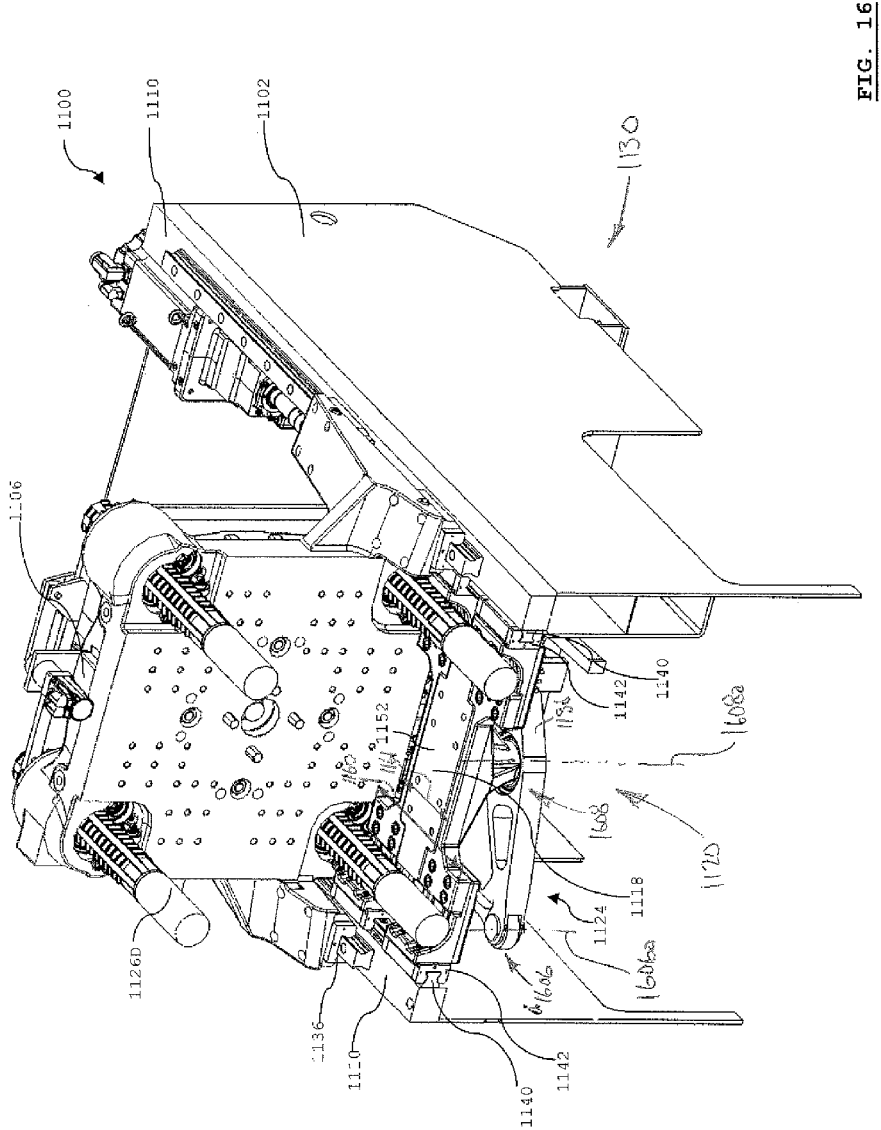
FIG. 16 is a partial section view of another example of an injection molding machine, looking in the direction of the moving platen.
Figure 17:
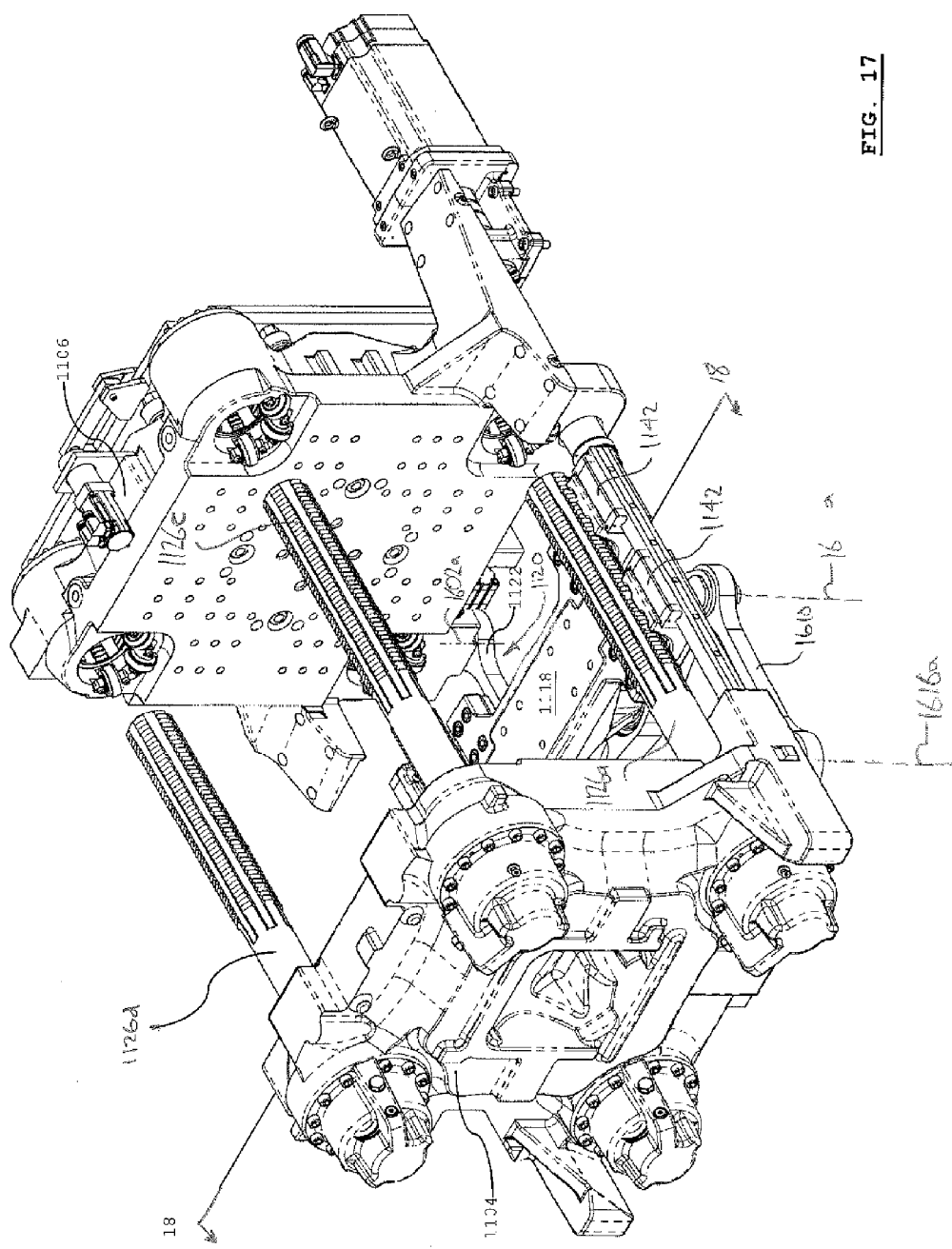
FIG. 17 is a perspective view of the platens and stack mold carriage of the injection molding machine of FIG. 16.

Referring to FIGS. 16 and 17, another example of an injection molding machine 1100 includes a stack mold carriage 1118 and an actuator 1120. The injection molding machine 1100 has some similarities to the injection molding machine 100, and like features are identified by like reference characters, incremented by 1000. FIG. 16 is a lateral section view of a portion of the injection molding machine 1100, looking toward the moving platen 1106. FIG. 17 is a perspective view of the platens 1104, 1106, the stack mold carriage 1118 and actuator 1120, isolated from the base 1102 for clarity.

In injection molding machine 1100, the stack mold carriage 1118 is positioned axially intermediate the fixed and moving platens 1104, 1106. An actuator 1120 is coupled to the stack mold carriage 1118 for translating the stack mold carriage 1118 towards and away from the stationary platen 1104. The actuator 1120 (see also FIG. 19) includes a driven member 1122 coupled to a carriage connection portion 1124, the carriage connection portion 1124 transferring motion from the driven member 1122 to translation of the stack mold carriage 1118.

Figure 18:
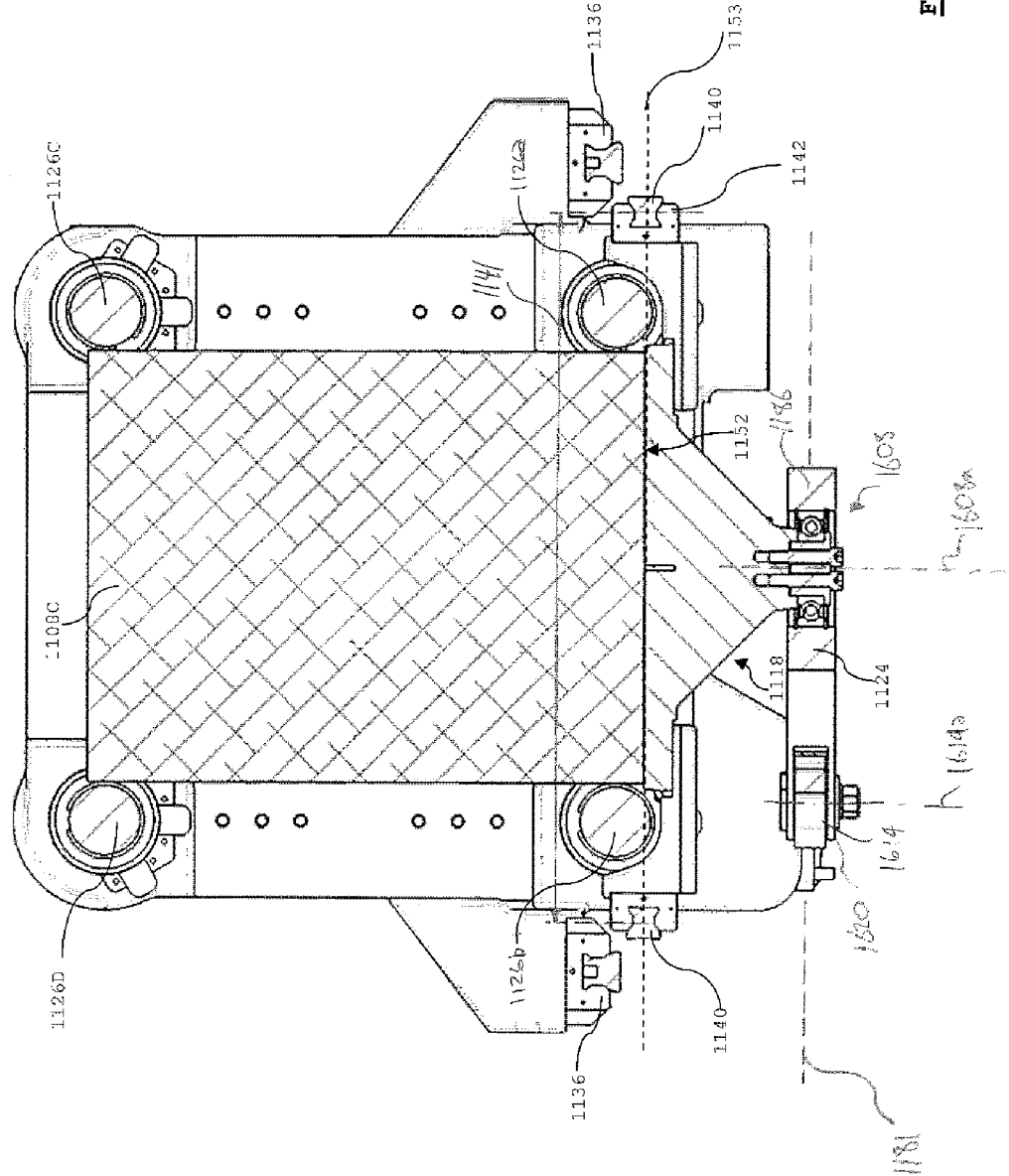
FIG. 18 is a section view taken along line 18-18 in FIG. 17.

Referring also to FIG. 18, in this example, the carriage rails 1140 are connected to the base 1102 at approximately the same elevation as the mounting face 1152. In this configuration, the mounting face 1152 lies in a plane 1153 that generally intersects the carriage rails through a central axis thereof. In this configuration, the plane 1153 containing the mounting surface 1152 also passes through at least a portion of the lower tie bars 1126a, 1126b. In this example, the stack mold carriage 1118 is suspended generally between the carriage rails 1140, as opposed to being positioned above, and riding on carriage rails 140 (as described above in other examples), and the carriage connection portion 1124 is located beneath the plane 1153. In FIG. 18, an example of a mold center section 1108c is mounted on the mounting surface 1152, and is positioned laterally between the tie bars 1126a and 1126b, and between 1126c and 1126d.

Figure 19:
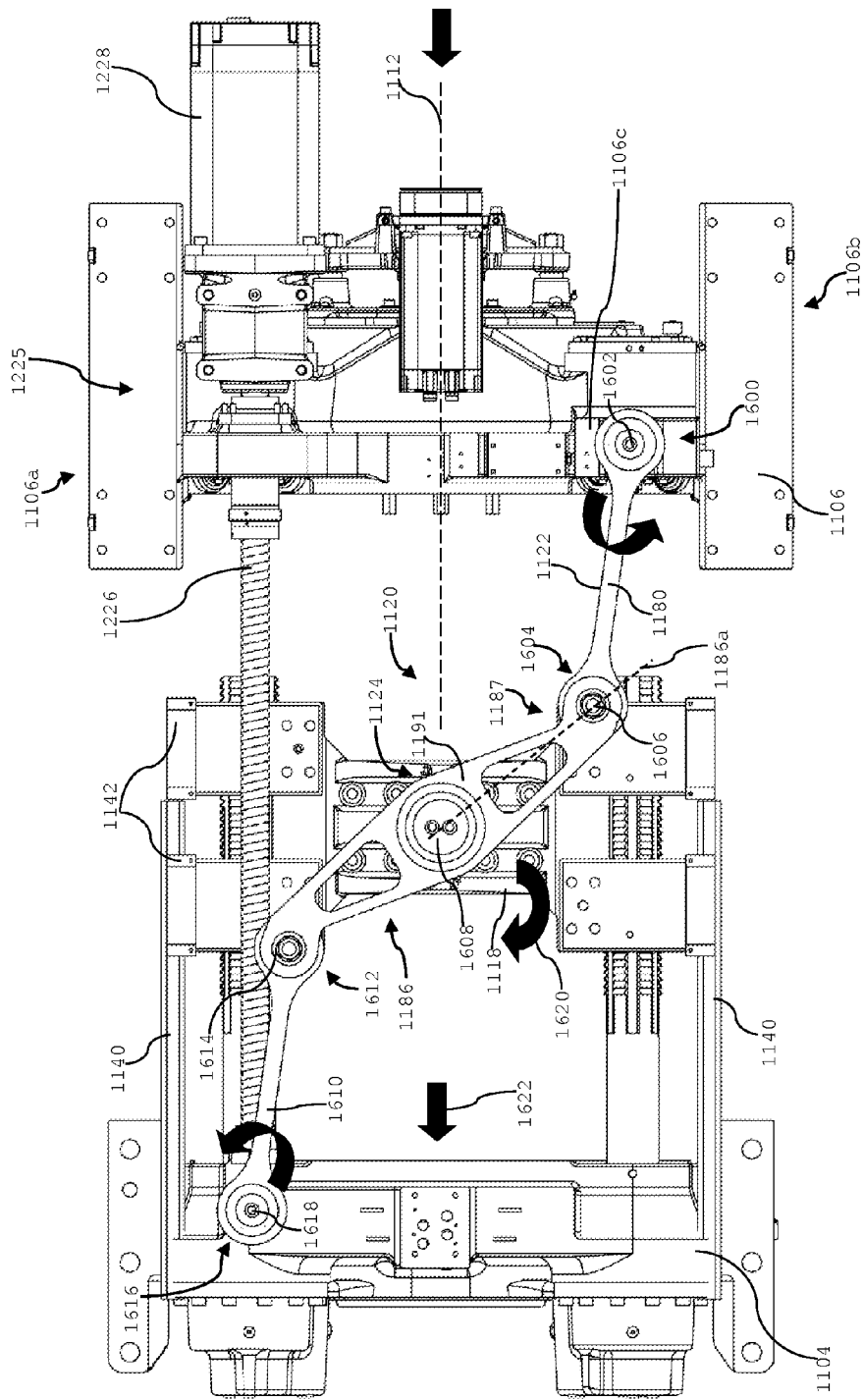
FIG. 19 is a bottom plan view of the platens and stack mold carriage of FIG. 17, with the moving platen in a retracted position.

Referring to FIG. 19, in this example, the driven member 1124 includes a generally elongate first link 1180. The first link 1180 has a first end 1600 and an opposed second end 1604. The first end 1600 is pivotally connected to the moving platen 1106 via a first pivot joint 1602, defining a first pivot axis 1602a (FIG. 17). The first end 1600 is coupled to the bottom surface 1106c of the moving platen 1106.

The second end 1604 of the first link 1180 is pivotally connected to the carriage connection portion 1124 via a second pivot joint 1606, defining a second pivot axis 1606a (FIG. 16). In the example illustrated, the first and second pivot axes 1602a, 1606a are generally parallel to each other, and are oriented in a generally vertical direction. In this configuration, first link 1180 lies in, and can pivot within, an actuator plane 1181 (FIG. 18) In the illustrated example, the actuator plane 1181 is generally horizontal and is generally parallel to and disposed below the plane 1153 that contains the mounting face 1152.

The carriage connection portion 1124 includes a generally elongate second link 1186 that is pivotally connected to the stack mold carriage 1118 via a third pivot joint 1608, defining a third pivot axis 1608a (FIG. 26). In the illustrated example, the third pivot joint 1608 is provided on the underside of the carriage 1118 (i.e. on the portion of the carriage 1118 that faces generally downward when the carriage 1118 is in use) The second link 1186 has a first end 1187, an opposed second end 1189 and a body 1191 extending therebetween. The first and second ends 1187, 1189 are separated from each other by a second link length 1193 (FIG. 11). The first end 1187 of the second link 1186 is pivotally connected to the second end 1604 of the second link 1180 via the second pivot joint 1606.

In the example illustrated, the carriage connection portion is generally in the form of a propeller member pivotally connected at about midway along its length 1193 to the underside of the carriage via the third pivot joint 1608. The propeller member (carriage connection portion 1124) generally pivots about the third pivot joint 1608 in a horizontal plane, about the generally vertical third pivot axis 1608a. In the example illustrated, the second link 1186 generally lies in, and pivots in, the actuator plane 1153 (see also FIGS. 16 and 18).

A third link 1610 extends between the carriage connection portion 1124 and the stationary platen 1104. The third link 1610 has a first end 1612 that is pivotally coupled to the second end 1189 of the second link 1186 via a fourth pivot joint 1614, and an opposing second end 1616 that is pivotally coupled to the stationary platen 1104 via a fifth pivot joint 1618. The fourth and fifth pivot joints 1614 and 1618 define respective fourth and fifth pivot axes 1614a and 1618a that are, in the example illustrated, generally vertically. In the illustrated example, the third link 1610 lies in, and can pivot in, the actuator plane 1153.

Figure 20:
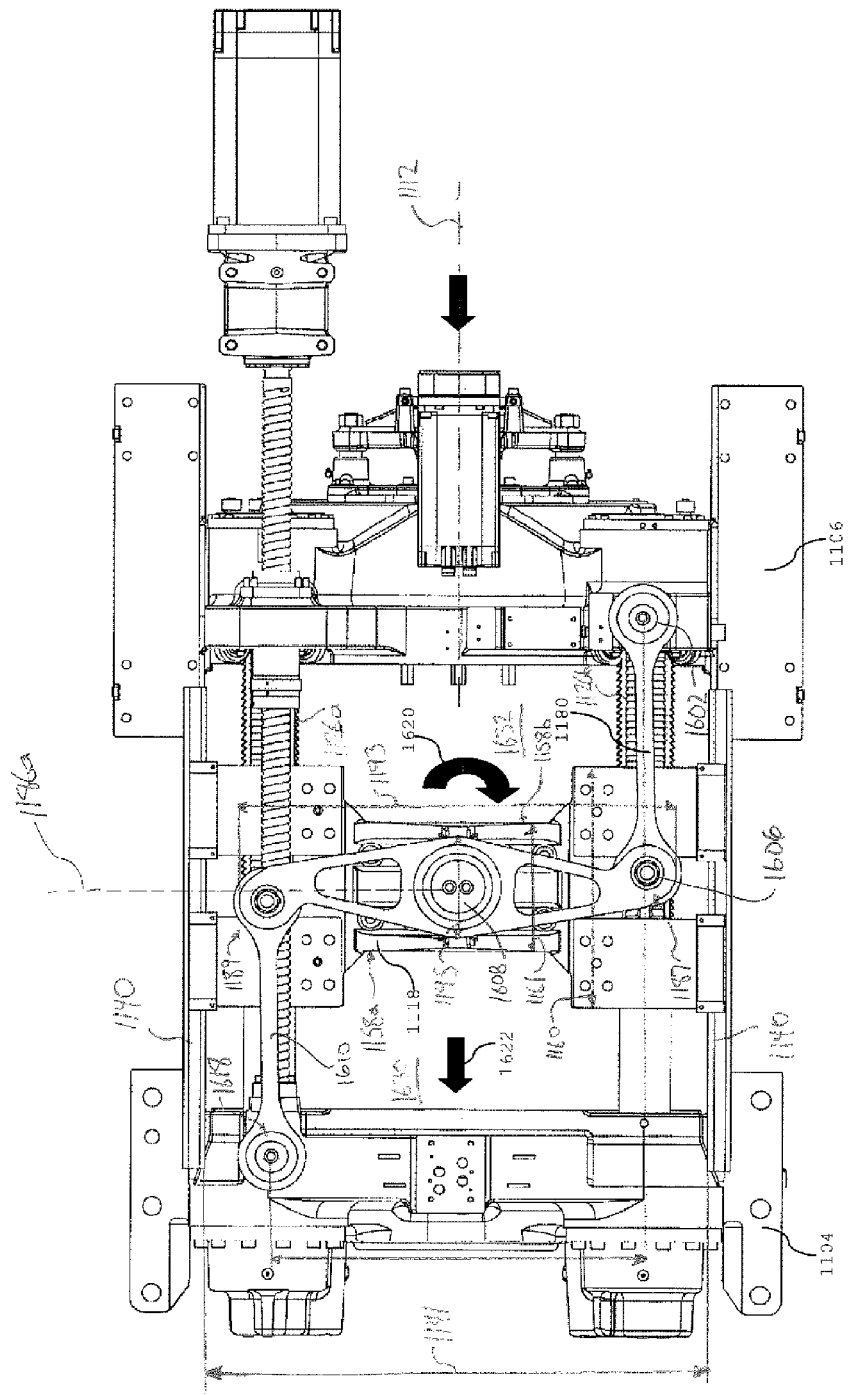
FIG. 20 is the bottom plan view of FIG. 19, with the moving platen in an intermediate position.

The second link length 1193 can be selected so that it is less than the lateral rail spacing distance 1141 between the carriage rails 1140 (FIG. 20). Optionally, the second link length 1193 can be selected so that it is greater than the lateral tie bar spacing 1128. In this configuration, when the second link 1186 is oriented in the generally lateral direction (i.e. when a second link axis 1186a is generally orthogonal to the machine axis 1112), the first end 1187 of the second link 1186 is positioned vertically beneath one pair of tie bars (for example the rear tie bars 1126b and 1126d) and the second end 1189 of the second link 1186 is positioned vertically beneath the other pair of tie bars (for example front tie bars 1126a and 1126c) (FIG. 16). Optionally, the length 1193 of the second link 1186 can be selected so that when the second link 1186 is oriented in the lateral direction the second pivot joint 1606 is registered vertically beneath the rear tie bars 1126b and 1126d, and the third pivot joint 1614 is registered vertically beneath the front tie bars 1126a and 1126c (see also FIG. 18).

The second link 1186 has a second link width 1195 (see FIG. 20) measured in a direction that is generally orthogonal to the second link length 1193. The second link width 1195 can be measured at the widest portion of the body 1191. Optionally, the second link width 1195 can define the widest width of the carriage connection portion 1124. In the illustrated example, the second link width 1195 is less than the overall axial extent 1160 of the carriage 1118. Optionally, the second link width 1195 can be selected so that it is less than the axial distance 1161 of the central portion of the carriage 1118 (i.e. the portion that comprises the mounting face 1152) (see also FIG. 16). The axial distance 1161 of the central portion of the carriage 1118 can be less than the overall axial extent 1160. In this configuration, when the second link 1186 is oriented in the lateral direction, the second link 1186 is registered vertically beneath the carriage 1118 and does not extend beyond mounting face 1152 in the axial direction (i.e. the direction parallel to the machine axis 1112).

Referring to FIG. 20, in the example illustrated, the second link length 1193 is selected so that it is approximately equal to the lateral spacing 1197 between the first pivot joint 1602 on the moving platen 1106, and the fifth pivot joint 1618. When the carriage 1118 is moved to an intermediate position between the stationary and moving platens 1104 and 1106, in which second link 1186 is oriented in the lateral direction (as illustrated in FIG. 20) the first link 1180 is generally aligned with and vertically registered below tie bar 1126b and the third link 1610 is generally aligned with and vertically registered below tie bar 1126a. In this intermediate position, substantially all of the carriage actuator 1120 is registered beneath another machine component (e.g. the first and third links 1180 and 1610 are registered beneath tie bars 1126b and 1126a, respectively, and the second link 1186 is registered beneath the carriage 1118).

In the illustrated example, when the carriage 1118 is moved to the intermediate position, no portion of the carriage actuator 1120 extends into the open regions 1630 and 1632 defined between the carriage 1118 and the stationary and moving platens 1104 and 1106, respectively. The open region 1630 is at least partially laterally bounded by the laterally opposed tie bars 1126a and 1126b, and is at least partially axially bounded between the inner axial edge 1158a of the carriage 1118 and the stationary platen 1104. The open region 1632 is at least partially laterally bounded by the laterally opposed tie bars 1126a and 1126b, and is at least partially axially bounded between the outer axial edge 1158b of the carriage 1118 and the moving platen 1106.

Positioning the carriage 1118 so that the open regions 1620 and 1632 are substantially free from obstruction by the carriage actuator 1120 may allow molded parts to freely fall through the open regions 1620 and 1632 when ejected from the mold sections, without contacting the carriage actuator 1118. This configuration may be advantageous if the intermediate position is used as a part ejection position.

In use, the moving platen 1106 can be translated among a retracted (mold-open) position (FIG. 18), one or more intermediate positions (FIG. 19), and an advanced (mold-closed) position (FIG. 20). The motive force for translating the moving platen 1106 can be provided by a platen actuator 1225, such as, for example, a ball screw 1226 driven by a servo motor 1228 (FIG. 19).

In the illustrated example, a single platen actuator 1225 (including a single ball screw 1226 and a single actuator 1228) is provided for translating the moving platen 1106. The platen actuator 1225 is laterally offset from the machine axis 1112, toward a first side 1106a of the moving platen 1106 (toward the top as viewed in FIG. 19). Optionally, the first pivot joint 1602 can be laterally spaced apart from the platen actuator 1225, and can be located toward an opposed, second side 1106b of the moving platen 1106. Locating the first pivot joint 1602 and platen actuator 1225 toward opposite sides of the moving platen 1106 may help prevent interference between the carriage actuator 1120 and the platen actuator 1225, and may help provide a desired amount of working space around both the carriage actuator 1120 and platen actuator 1225 (for example to help facilitate assembly and/or maintenance of the actuators). Alternatively, the first pivot joint 1602 can be located at any other suitable location on the moving platen 1106.

The motive force provided by the platen actuator can be transferred to the first link 1180 of the actuator 1120, via the moving platen 1106. Force applied to the first link 1180 is then transferred to the second link 1186, via the second pivot joint 1606, which may cause the second link 1186 to rotate relative to the stack mold carriage 1118, about the third pivot joint 1608 (in the direction indicated by arrow 1620 in FIG. 19). Because movement of the fourth pivot joint 1614 in the direction 1620 is generally restrained by the third link 1610, rotation of the second link 1186 can cause axial displacement of the stack mold carriage 1118 in the axial direction, as indicated by arrow 1622. In other words, when the two platens 1104 and 1106 are drawn axially towards each other, the first and third links 1180, 1610 pivot about the first and fifth joints 1602, 1618, respectively, and the propeller member pivots about the third pivot joint 1608.

Figure 21:
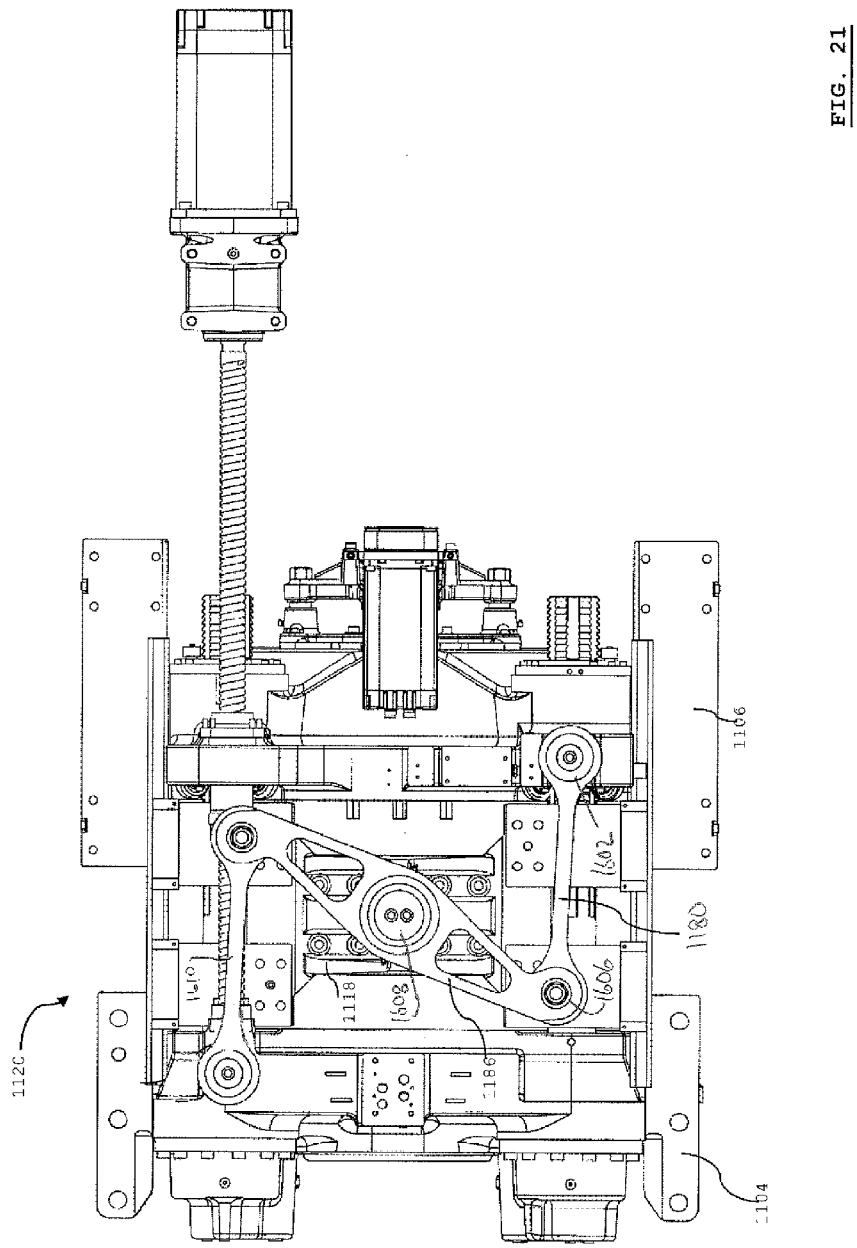
FIG. 21 is the bottom plan view of FIG. 19 with the moving platen in an advanced position.

As the moving platen 1106 is moved closer to the stationary platen 1104 (FIGS. 20 and 21), the displacement of the first pivot joint 1602 (and the first link 180) cause further rotation of the second link 1186 and further axial displacement of the stack mold carriage 1118, in the manner described above. Conversely, when the moving platen 1106 is moved away from the stationary platen 1104, the operation of the actuator 1120 is reversed, and the stack mold carriage 1118 is moved away from the stationary platen 1104.

The dimensions and configuration of the driven member 1122, carriage connection portion 1124 and third link 1610 can be selected to achieve the desired amount of stack mold carriage 1118 axial travel in response to the movements of the moving platen 1106.

Figure 22:
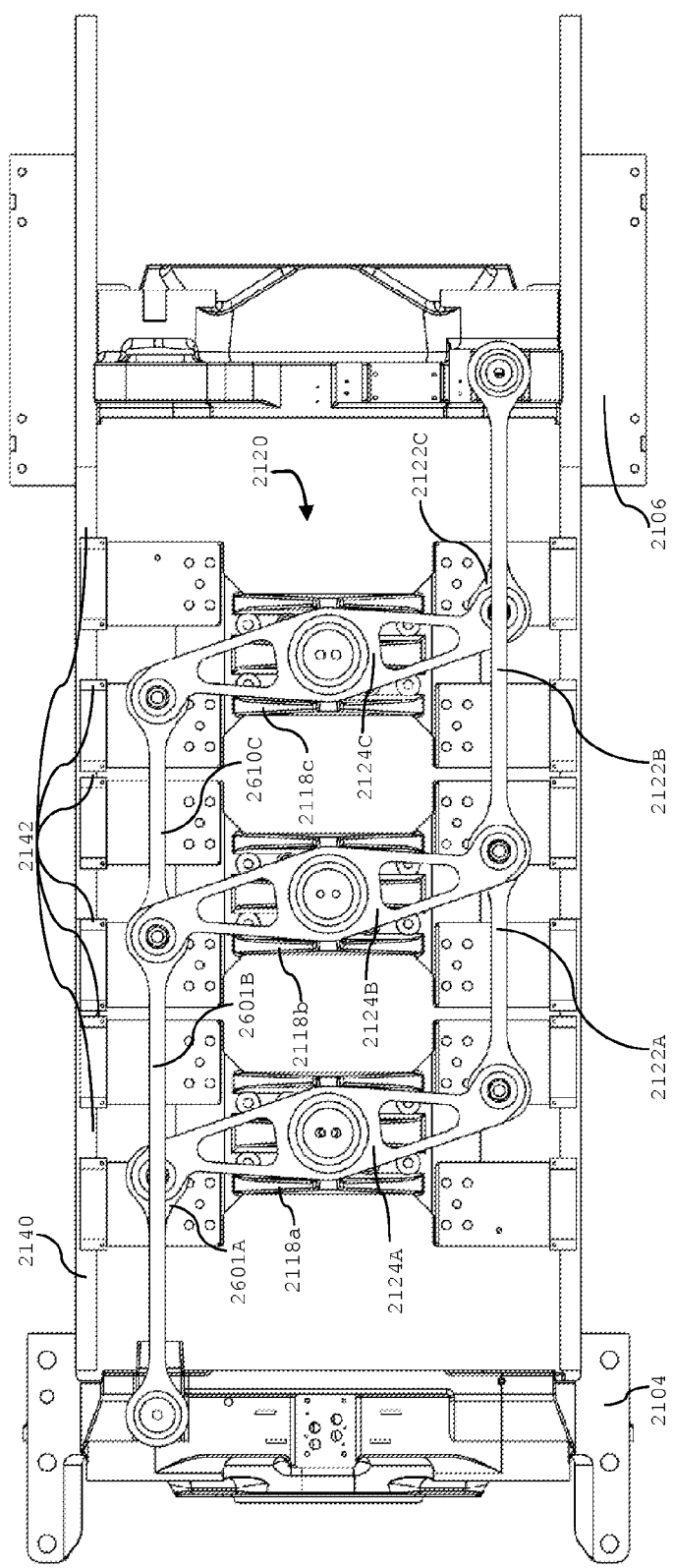
FIG. 22 is a bottom plan view of the platens and stack mold carriages of another example of an injection molding machine.

Optionally, an injection molding machine can be configured to carry multiple centre mold sections on multiple stack mold carriages. In such instances, the stack mold actuators described herein, for example actuator 1120, can be adapted to drive multiple the stack mold carriages. For example, referring to FIG. 22, another example of an injection molding machine 2100 includes a plurality of stack mold carriages 2118a-c and an actuator 2120. The injection molding machine 2100 has some similarities to the injection molding machine 1100, and like features are identified by like reference characters, incremented by 1000.

In this example, the actuator 2120 includes one carriage connection portion 2124a-c pivotally connected to each stack mold carriage 2118a-c. Each carriage connection portion 2124a-c is drivingly connected to the moving platen 2106 via a respective driven member 2122a-c, and is connected to the stationary platen 2104 by a respective third link 2610a-c.

In the illustrated example, driven members 2122b and 2122c are directly connected to the moving platen 2106, and driven member 2122a is indirectly connected to the moving platen 2106, via driven member 2122b. Providing an indirect connection between driven member 2122a and the moving platen 2106 may help reduce the length of driven member 2122a. Similarly, third links 2610a and 2610b are directly connected to the stationary platen 2104, and third link 2610c is indirectly connected to the stationary platen 2104 via third link 2610b. Alternatively, each driven member 2122a-c may be directly connected to the moving platen 2106 and each third link 2610a-c may be directly connected to the stationary platen 2104.

In this configuration, when the moving platen 2106 is moved toward the stationary platen 2104, the motive force, transferred via the driven members 2122a-c, can cause rotation of the carriage connection portions 2124a-c. Rotation of the carriage connection portions 2124a-c can cause corresponding axial displacement of the stack mold carriages 2118a-c, in the manner described with reference to actuator 1120.

The actuators 120 and 1120 can be configured so that connect to the stack mold carriage at a location that is laterally inboard of the tie bars, and optionally is below the mold mounting surface. Optionally, the actuators can be configured so that they generally contained within the base of the injection molding machine, and extend generally beneath the platens. Alternatively, the actuators could be positioned on the top of the injection molding machine, instead of beneath the platens.

Positioning the actuators below (or optionally above) the platens may leave the sides of the injection molding machine generally open and free from obstruction portions of the stack mold carriage actuators. Providing generally open sides on the injection molding machine may help facilitate operator access to the platens and mold portions supported thereon. For example, providing open sides may help facilitate mold inspection or maintenance and mold changes.

Providing open sides on the injection molding machine may also help facilitate the placement and operation of automation equipment, including, for example, robots and takeout plates, that may require access to the molds, and the spaces between the open mold halves, to remove material from, or insert material into the molds.

Preferably, the stack mold carriage actuators, particularly the carriage connection portions, are positioned at an elevation that is below the platens. In the illustrated examples, the upper side of the injection molding machine is also free from obstruction by the stack mold carriage actuators. Providing a generally open upper side of the injection molding machine may help facilitate access to the molds and platens from above the machine, for example when using an overhead gantry crane. This may also facilitate the use of overhead or top mounted automation equipment.

Containing the moving components of the stack mold carriage actuators generally within the base of the injection molding machine may reduce the likelihood that the actuators may pose a safety risk to machine operators standing beside the injection molding machine. It may also allow a smaller safety shroud or gate to be used to surround the platens, which may help reduce overall machine width in the lateral direction. In the examples illustrated, the width of the injection molding machine is generally constant along the entire length of the machine, and no portion of the stack mold carriage actuators extend laterally beyond the side edges of the machine base, or the side edges of the platens.

While the above description provides examples of one or more processes or apparatuses, it will be appreciated that other processes or apparatuses may be within the scope of the accompanying claims.

The invention claimed is:

1. An injection molding machine, comprising:
   a) a base;
   b) a stationary platen fixed to the base for holding a first mold section;
   c) a moving platen for holding a second mold section, the moving platen slidably supported on a platen slide surface fixed to an upper surface of the base and generally beneath the moving platen, the moving platen moveable towards and away from the stationary platen along a machine axis;
   d) a stack mold carriage for holding a mold center section, the stack mold carriage slidably coupled to the base and positioned intermediate the fixed and moving platens; and
   e) an actuator coupled to the stack mold carriage for translating the stack mold carriage along the machine axis towards and away from the stationary platen, the actuator comprising a driven member coupled to a carriage connection portion and to the moving platen, the carriage connection portion transferring motion from the moving platen and the driven member to translation of the stack mold carriage, and the carriage connection portion joined to the stack mold carriage at an elevation below the platen slide surface.

2. The injection molding machine of claim 1, wherein the stack mold carriage comprises a generally horizontal mounting face for connection to the mold center section, and the mounting face is positioned at an elevation below the platen slide surface.

3. The injection molding machine of claim 2, further comprising two upper tie bars and two lower tie bars, each tie bar extending parallel to the machine axis, between the stationary and moving platens for axially clamping together the first and second mold sections during an injection cycle, wherein the carriage connection portion is disposed at an elevation below the lower tie bars.

4. The injection molding machine of claim 3, wherein the stack mold carriage, when installed for use, has an axial extent that is less than a lateral spacing between the two lower tie bars and a lateral extent that is greater than the lateral spacing between the two lower tie bars, the stack mold carrier removable from the machine by rotating and then lifting the stack mold carrier through the lateral spacing between the at least two lower tie bars.

5. The injection molding machine of claim 3, wherein the stationary platen includes a sprue hole generally centrally located of the stationary platen, and the machine axis passes through the center of the sprue hole, and wherein the mounting face extends laterally across the machine axis from a front edge disposed toward an operator side of the injection molding machine to a back edge disposed toward a non-operator side of the injection molding machine.

6. The injection molding machine of claim 3, wherein the mounting face is positioned at an elevation below the lower tie bars when the moving platen is in and moves between the advanced and retracted positions relative to the stationary platen.

7. The injection molding machine of claim 1, wherein the stack mold carriage, when installed for use, comprises a first carriage side edge disposed towards a first side of the machine, and an opposed second carriage side edge laterally spaced apart from the first side edge in a lateral direction that is generally perpendicular to the machine axis, and wherein the carriage connection portion extends generally parallel to the machine axis and is disposed laterally between the first and second carriage side edges.

8. The injection molding machine of claim 7, wherein the driven member is laterally offset from the machine axis.

9. The injection molding machine of claim 3, further comprising a pair of stack mold carriage rails to which the stack mold carriage is slidably coupled, the stack mold carriage rails being separate from the platen slide surface.

10. The injection molding machine of claim 9, wherein the platen slide surface is defined by a pair of platen rails on opposed sides of the base, and the stack mold carriage rails are positioned laterally inboard of the platen rails.

11. An injection molding machine, comprising:
a) a base;
b) a stationary platen fixed to the base for holding a first mold section;
c) a moving platen for holding a second mold section, the moving platen slidably supported on a platen slide surface fixed to the base and moveable towards and away from the stationary platen along a machine axis;
d) a stack mold carriage for holding a mold center section, the stack mold carriage slidably coupled to the base and positioned intermediate the fixed and moving platens; and
e) an actuator coupled to the stack mold carriage for translating the stack mold carriage along the machine axis towards and away from the stationary platen, the actuator comprising a driven member coupled to a carriage connection portion, the carriage connection portion transferring motion from the driven member to translation of the stack mold carriage, and the carriage connection portion joined to the stack mold carriage at an elevation below the platen slide surface,
wherein the driven member comprises at least a first link comprising a first link first end pivotally coupled to the moving platen by a first pivot joint and a first link second end spaced apart from the first link first end, and the carriage connection portion comprises at least a second link comprising a second link first end pivotally coupled to the first link second end by a second pivot joint and being pivotally coupled to the stack mold carriage by a third pivot joint, whereby translation of the moving platen causes rotation of the first link and the second link and translation of the stack mold carriage.

12. The injection molding machine of claim 11, wherein the third pivot joint defines a generally vertical third pivot axis fixed in position relative to the stack mold carriage and about which the second link pivots.

13. The injection molding machine of claim 12, further comprising a third link coupled between the second link and the stationary platen, the third link having a third link first end and a third link second end, wherein the second link further comprises a second link second end spaced part from the second link first end, the third pivot axis disposed horizontally intermediate the second link first end and the second link second end, and second link second end being pivotally coupled to the third link first end by a fourth pivot joint.

14. The injection molding machine of claim 13, wherein the first link pivots about a generally vertical first pivot axis defined by the first pivot joint, the first pivot axis being generally parallel to and laterally spaced apart from the third pivot axis.

15. The injection molding machine of claim 13, further comprising a pair of stack mold carriage rails along which the stack mold carriage is slidably coupled, the stack mold carriage rails being laterally spaced apart from each other by a lateral rail spacing, and wherein the second link has a second link length generally extending between the second link first end and the second link second end, the second link length being less than the lateral rail spacing.

16. The injection molding machine of claim 13, further comprising two upper tie bars and two lower tie bars, each tie bar extending parallel to the machine axis, between the stationary and moving platens for axially clamping together the first and second mold sections during an injection cycle, wherein the carriage connection portion is disposed at an elevation below the lower tie bars, and wherein the second link comprises a second link axis extending between the second link first end and the second link second end, whereby when the second link is pivoted so that the second link axis is generally orthogonal to the machine axis, the first link is generally aligned with and vertically registered beneath a first one of the two lower tie bars and the third link is generally aligned with and vertically registered beneath a second one of the two lower tie bars.

17. The injection molding machine of claim 16, wherein the stack mold carriage comprises, when installed for use, a central portion comprising a first axial edge facing the moving platen and an opposed second axial edge facing the stationary platen and spaced apart from the first axial edge by a central axial distance, and wherein the second link comprises a second link width generally orthogonal to the second link axis, the second link width less than the central axial distance.

18. The injection molding machine of claim 17, wherein when the second link is pivoted so that the second link axis is generally orthogonal to the machine axis, the second link is disposed generally entirely beneath the stack mold carriage, wherein, when viewed from above, first and second open regions are provided adjacent each axial edge of the stack mold carriage, each open region bounded laterally by the first and second lower tie bars, and the first and second open regions bounded axially at least in part by the respective first and second axial edges of the stack mold carriage.

19. An injection molding machine, comprising:
a) a base;
b) a stationary platen fixed to the base for holding a first mold section;
c) a moving platen for holding a second mold section, the moving platen slidably supported on a platen slide surface fixed to the base, and moveable towards and away from the stationary platen along a machine axis;
d) a first carriage rail extending parallel to the machine axis along a first side of the base, and an opposed second carriage rail extending parallel to the machine axis along a second side of the base;
e) a stack mold carriage for holding a mold center section, the stack mold carriage slidably mounted on the first and second carriage rails and positioned intermediate the fixed and moving platens; and
f) an actuator coupled to the stack mold carriage for translating the stack mold carriage along the first and second carriage rails towards and away from the stationary platen, the actuator comprising a carriage connection portion and a driven member pivotally coupled to the carriage connection portion, the carriage connection portion pivotally coupled to the stack mold carriage and transferring motion from the driven member to translation of the stack mold carriage, and the carriage connection portion pivotable about a generally vertical pivot axis.

20. The machine of claim 19, wherein the driven member comprises a first link having a first end pivotally coupled to the moving platen, and a second end pivotally coupled to the carriage connection portion.

* * * * *